United States Patent
Matsui et al.

(10) Patent No.: US 7,326,288 B2
(45) Date of Patent: Feb. 5, 2008

(54) TRISAZO COMPOUND, INK COMPOSITION, AND COLORED OBJECT

(75) Inventors: Takahiko Matsui, Kita-ku (JP); Hiroaki Ohno, Kita-ku (JP); Takashi Yoneda, Kita-ku (JP); Yoshiaki Kawaida, Kita-ku (JP); Yasuo Shirasaki, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 77 days.

(21) Appl. No.: 10/581,469

(22) PCT Filed: Nov. 26, 2004

(86) PCT No.: PCT/JP2004/017556

§ 371 (c)(1),
(2), (4) Date: Jun. 1, 2006

(87) PCT Pub. No.: WO2005/054374

PCT Pub. Date: Jun. 16, 2005

(65) Prior Publication Data

US 2007/0107628 A1    May 17, 2007

(30) Foreign Application Priority Data

Dec. 2, 2003  (JP) .............................. 2003-403311
Oct. 5, 2004  (JP) .............................. 2004-292599

(51) Int. Cl.
*C09D 11/00*  (2006.01)
*C09D 11/02*  (2006.01)
*C09B 31/16*  (2006.01)
*B41J 2/01*   (2006.01)

(52) U.S. Cl. .................... 106/31.52; 534/815; 347/100
(58) Field of Classification Search ............ 106/31.52; 534/815; 347/100
See application file for complete search history.

(56) References Cited

U.S. PATENT DOCUMENTS 5,437,716 A * 8/1995 Sano et al. ............... 106/31.52
6,409,810 B1 * 6/2002 Ono et al. ................. 106/31.13
6,632,932 B1 * 10/2003 Sawatari et al. ............ 534/810
6,858,069 B2 * 2/2005 Aoyama et al. ........... 106/31.52

FOREIGN PATENT DOCUMENTS

JP    62-109872    5/1987
JP    2003-201412  7/2003

OTHER PUBLICATIONS

The International Search Report dated Feb. 22, 2005.

* cited by examiner

*Primary Examiner*—Helene Klemanski
(74) *Attorney, Agent, or Firm*—Nields & Lemack

(57) ABSTRACT

[PROBLEMS] To provide: a black compound which is for use in ink-jet recording or writing utensils, is excellent in ozone resistance, light resistance, moisture resistance, and color rendering, and gives a recording fluid having satisfactory storage stability; and an ink composition containing the compound. [MEANS FOR SOLVING PROBLEMS] The black compound is a trisazo compound represented by the following formula (1) or a salt thereof. (1) [In the formula (1), $R^1$ and $R^2$ each independently represents hydrogen, carboxy, sulfo, hydroxy, a $C_{1-4}$ alkyl, $C_{1-4}$ alkoxy, or sulfo group optionally substituted by $C_{1-4}$ alkoxy, an optionally carboxylated $C_{1-4}$ alkoxy group, etc.; and A represents phenyl or naphthyl (provided that the phenyl and naphthyl groups may be substituted by halogeno, carboxy, sulfo, sulfamonyl optionally substituted by alkyl or phenyl, nitro, etc.).]

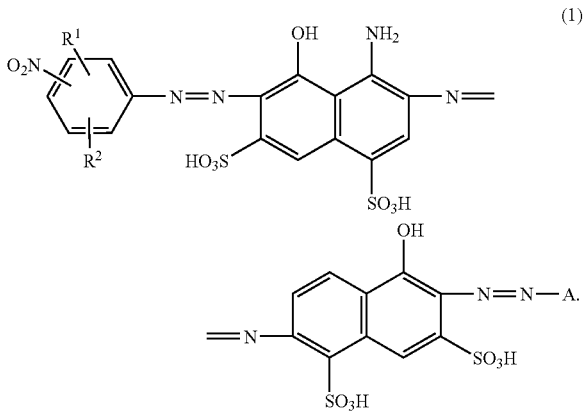

16 Claims, No Drawings

TRISAZO COMPOUND, INK COMPOSITION, AND COLORED OBJECT

TECHNICAL FIELD

The present invention relates to a novel trisazo compound and salt thereof, ink composition containing same and a colored object thereby.

BACKGROUND OF THE INVENTION

A method for recording by means of an ink-jet printer, a typical method among various color recording methods, comprised generating ink droplets and depositing them onto various recording materials (such as paper, film and cloth). This method has been rapidly prevailing lately and is expected to grow remarkably in the future because of such features as less noise generation due to no contact of a recording head with a recording material and easiness in downsizing and speeding up. Conventionally, as ink for a fountain pen or a felt pen and an ink for ink-jet recording, a water-based ink dissolving a water-soluble dye in a water-based medium has been used. Therefore, in these water-soluble inks, a water-soluble organic solvent is generally added to prevent ink from clogging at a pen tip or an ink-jet nozzle. These conventional inks are required to provide a recorded image of sufficient density, not to clog at a pen tip or an ink-jet nozzle, to dry quickly on a recording material, to bleed less, to have good storage stability and, in particular, to have high solubility in water and a water-soluble organic solvent to be added to the inks. Moreover, an image formed is required to have image fastness such as water fastness, light fastness, ozone gas fastness and moisture fastness.

Ozone gas fastness, normally called ozone fastness or gas fastness in short, means durability against phenomenon that oxidizing ozone gas in the air reacts with a dye on a recording paper to incur discoloration or fading of a printed image. Although oxidizing gas having this kind of action includes NOx and SOx besides ozone gas, ozone gas is said to be a causative substance to promote the phenomenon of discoloration or fading of an ink-jet recorded image, further than these oxidizing gases. In particular, for an ink-receiving layer mounted at the surface of a paper for exclusive use for ink-jet photographic image, so as to dry the ink faster and decrease bleed on the paper of high image quality, porous materials of inorganic white pigments and the like are often used. Discoloration or fading in color caused by ozone gas occurs noticeably on such recording papers. As the phenomenon of discoloration or fading caused by oxidizing gas are characteristics of ink-jet images, improvement of ozone gas fastness is one of the most important problems.

To extend application field of a printing method using ink in the future, an ink composition to be used for ink-jet recording and a colored object thereby are strongly required to exhibit further improved water fastness, light fastness, moisture fastness and ozone gas fastness.

Among inks with various hues prepared form various dyes, a black ink is an important one used for both of mono color and full color images. So far many dye stuffs for black inks have been proposed, however, a product sufficiently satisfying market needs has not yet been provided. Many of colorants proposed are disazo ones, which have problems that they have too light hues (black with a red cast), poor color rendition, less water and/or moisture fastness, insufficient ozone gas fastness and the like. Moreover, similarly, in the case of azo metal colorant often proposed, as containing metal ions, they have problems such that considerations for human bodies and environmental safety are not exhibited enough, ozone gas fastness is not sufficient, and the like. Tetraazo colorant whose conjugated system was expanded to deepen hues leave problems such as low hues density, poor solubility in water, poor storage stability for solution and ink, insufficient ozone gas fastness and the like.

As a colorant compound for black ink used for ink-jet having improved ozone gas fastness which has been the most important assignment recently, for example, those described in Patent Literature 1 can be cited. However, the ozone gas fastness of those compounds doesn't satisfy market needs sufficiently. Furthermore, as compounds which structurally approximate to colorant compounds for black inks according to the present invention, those described in Patent Literatures 2 or 3, however, they don't satisfy market needs, particularly concerning ozone gas fastness.

Patent Literature 1: JP Laid-Open No. 183545/2003
Patent Literature 2: JP Laid-Open No. 109872/1987
Patent Literature 3: JP Laid-Open No. 201412/2003

DISCLOSURE OF THE INVENTION

Problems to be Solved by the Invention

An object according to the present invention is to provide a colorant for a black ink and an ink composition thereof that has high solubility in medium whose main component is water, stability in long-term storage of high concentrated dye solution and ink, high density of a printed image, fastness of a printed image, that gives a black recorded image with especially excellent ozone gas fastness, and that is also easy to compose and inexpensive.

Means of Solving the Assignments

The inventors intensively studied a way to solve the above problems, and thus have completed the present invention. That is, the present invention relates to:

(1) A trisazo compound represented by Formula (1) as shown below or a salt thereof;

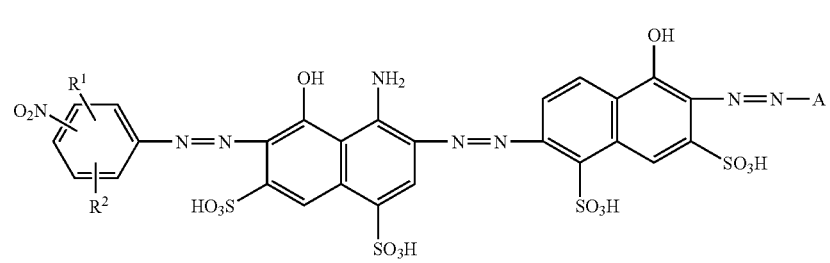

(wherein, each of $R^1$ and $R^2$ independently represents a hydrogen atom; a halogen atom; a cyano group; a carboxyl group; a sulfo group; a sulfamoyl group; an N-alkylaminosulfonyl group; an N-phenylaminosulfonyl group; a phosphoric acid group; a nitro group; an acyl group; a ureide group; a (C1 to C4) alkyl group which may be substituted with a hydroxy group or a (C1 to C4) alkoxy group; a (C1 to C4) alkoxy group which may be substituted with a hydroxy group, a (C1 to C4) alkoxy group, a sulfo group or a carboxyl group; or an acylamino group: A represents a phenyl group or a naphthyl group (wherein, these phenyl group and naphthyl group may be substituted with a halogen atom; a cyano group; a carboxyl group; a sulfo group; a sulfamoyl group which may be substituted with an alkyl group or a phenyl group; a phosphoric acid group; a nitro group; an acyl group; a ureide group; a (C1 to C4) alkyl group which may be substituted with a hydroxy group or a (C1 to C4) alkoxy group; a (C1 to C4) alkoxy group which may be substituted with a hydroxy group, a (C1 to C4) alkoxy group, a sulfo group or a carboxyl group; or an acylamino group.))

(2) The trisazo compound or the salt thereof according to the above aspect (1), wherein Formula (1) is represented by Formula (2) as shown below;

(3) The trisazo compound or the salt thereof according to the above aspect (2), wherein in Formula (2), $R^1$ is bonded at the 2-position of an azo group, a nitro group is bonded at the 4-position, $R^2$ is bonded at the 5-position, $R^3$ is bonded at the 2-position of an azo group, $R^4$ is bonded at the 4-position and $R^5$ is bonded at the 5- or 6-position;

(4) The trisazo compound or the salt thereof according to the above aspect (3); wherein in Formula (2), $R^3$ is a carboxyl group or a sulfo group, $R^4$ is a carboxyl group, a sulfo group, a sulfamoyl group, an N—(C1 to C4) alkylaminosulfonyl group, a nitro group or a (C1 to C4) alkoxy group, $R^5$ is a hydrogen atom or a carboxyl group, $R^3$ is bonded at the 2-position of an azo group, $R^4$ is bonded at the 4-position and $R^5$ is bonded at the 5-position;

(5) The trisazo compound or the salt thereof according to the above aspect (1), wherein Formula (1) is represented by Formula (2') as shown bellow;

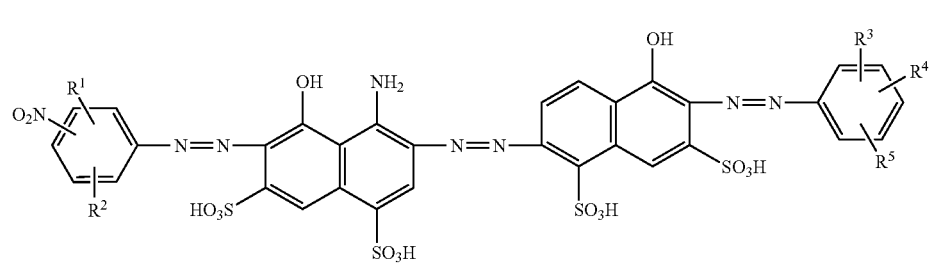

(2)

(wherein, $R^1$ represents a carboxyl group, a sulfo group, or a (C1 to C4) alkoxy group, $R^2$ represents a hydrogen atom or a sulfo group, $R^3$ represents a carboxyl group, a sulfo group, or a (C1 to C4) alkoxy group, $R^4$ represents a hydrogen atom, a halogen atom, a carboxyl group, a sulfo group, a nitro group, a (C1 to C4) alkoxy group, a sulfamoyl group or an N—(C1 to C4) alkylaminosulfonyl group, and $R^5$ represents a hydrogen atom, a carboxyl group or a sulfo group, respectively;

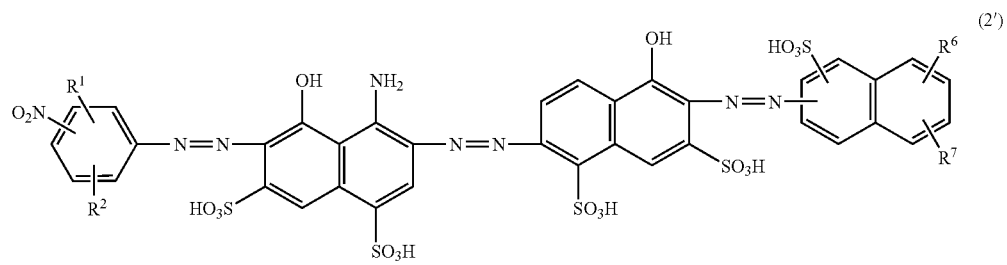

(2')

(wherein, $R^1$ represents a carboxyl group or a sulfo group, $R^2$ represents a hydrogen atom, $R^6$ represents a sulfo group or a nitro group, and $R^7$ represents a hydrogen atom or a sulfo group respectively.)

(6) The trisazo compound or the salt thereof according to the above aspect (5), wherein in Formula (2'), $R^1$ is bonded at the 2-position of an azo group, a nitro group on a phenyl group is bonded at the 4-position, and for a naphthyl group substituted with $R^6$ and $R^7$, an azo group is bonded at the 1- or 2-position of a naphthyl group, $R^6$ is bonded at the 5- or 6-position, and $R^7$ is bonded at the 7- or 8-position;

(7) A trisazo compound represented by Formula (2-1) as shown bellow or a salt thereof;

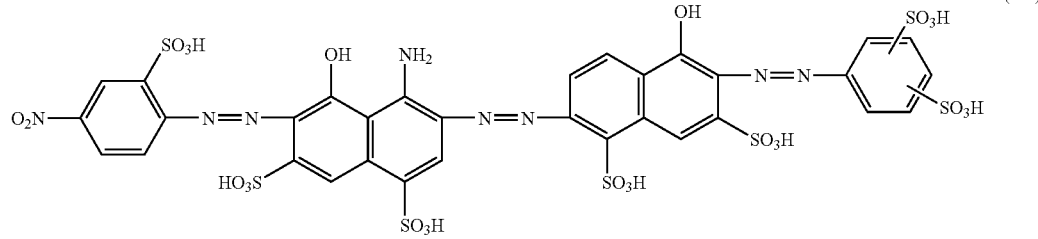

(2-1)

(8) The salt of the trisazo compound according to any one of the above aspects (1) to (7), wherein a salt is a lithium salt, a sodium salt, a potassium salt, an ammonium salt, or an ammonium salt represented by the general Formula (3);

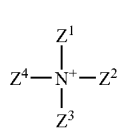

(3)

(wherein, in Formula (3), each of $Z^1$, $Z^2$, $Z^3$, and $Z^4$ independently represents a hydrogen atom, an alkyl group, a hydroxyalkyl group or a hydroxyalkoxyalkyl group, (9) An ink composition characterized by comprising at least one of a trisazo compound or the salt thereof according to any one of the above aspects (1) to (8);

(10) An ink-jet printer equipped with a container containing the ink composition according to the above aspect (9);

(11) A recording method of ink-jet printing using the ink composition according to the above aspect (9);

(12) A recording method of ink-jet printing, wherein a record-receiving material for a method of ink-jet printing according to the above aspect (11) is an information transmission sheet;

(13) The recording method of ink-jet printing according to the above aspect (12), characterized by an information transmission sheet which comprises a porous white inorganic matter;

(14) A colored object colored by the trisazo compound or the salt thereof according to any one of the above aspects (1) to (8)

EFFECT OF THE INVENTION

A trisazo compound according to the present invention has excellent water-solubility, therefore a filtration property with a membrane filter during production steps of ink composition is favorable, and it exhibits excellent stability in storage of a recording solution and jet stability. Furthermore, an ink composition comprising the trisazo compound according to the present invention does not exhibit crystal deposition, change in physical property, nor color change after storage for a long period of time, and exhibits favorable storage stability. And an ink composition comprising the trisazo compound according to the present invention is used for ink-jet recording, and for writing tools, and when a recording image is made on a Plain Paper and a paper exclusive use for ink-jet, printing density of a recorded image is high and fastness of various properties, in particular, ozone gas fastness is excellent. By using it together with a magenta, a cyan, and a yellow dye, full-colored ink-jet recording with excellence in fastness of various properties is possible. Thus an ink composition according to the present invention is extremely useful as a black ink for ink-jet recording.

BEST MODE FOR CARRYING OUT THE INVENTION

The present invention will be described in detail hereinafter.

As for a substituent which can be substituted with a phenyl group or a naphthyl group of $R^1$ to $R^5$ and A in the general Formulas (1) and (2), examples of an acyl group include an acetyl group, a propionyl group, a butylyl group, isobutylyl group, benzoyl group, a naphtoyl group and the like.

As for a substituent which can be substituted with a phenyl group or a naphthyl group of $R^1$ to $R^5$ and A in the general Formulas (1) and (2), examples of a sulfamoyl group which may be substituted with an alkyl group or a phenyl group include a sulfamoyl group, an N-methylsulfamoyl group, an N-ethylsulfamoyl group, an N-(n-butyl)sulfamoyl group, an N,N-dimethylsulfamoyl group, an N,N-di(n-propyl)sulfamoyl group, N-phenylsulfamoyl group and the like.

As for a substituent which can be substituted with a phenyl group or a naphthyl group of $R^1$ to $R^5$ and A in the general Formulas (1) and (2), examples of a (C1 to C4) alkyl group which may be substituted with a hydroxy group or (C1 to C4) alkoxy group include a methyl group, an ethyl group, an n-propyl group, an isopropyl group, an n-butyl group, an isobutyl group, a sec-butyl group, a tert-buthyl group, a 2-hydroxyethyl group, a 2-hydroxypropyl group, a 3-hydroxypropyl group, a methoxyethyl group, a 2-ethoxyethyl group, an n-propoxyethyl group, an isopropoxyethyl group, an n-butoxyethyl group, a methoxypropyl group, an ethoxypropyl group, an n-propoxypropyl group, an isopropoxybutyl group, an n-propoxybutyl group and the like.

As for a substituent which can be substituted with a phenyl group or a naphthyl group of $R^1$ to $R^5$ and A in the general Formulas (1) and (2), examples of a (C1 to C4) alkoxy group which may be substituted with a hydroxy group, a (C1 to C4) alkoxy group, a sulfo group or a carboxyl group include a methoxy group, a ethoxy group, an n-propoxy group, an isopropoxy group, an n-butoxy group, a sec-butoxy group, a tert-butoxy group, a 2-hydroxyethoxy gourp, a 2-hydroxypropoxy group, a 3-hydroxypropoxy group, a methoxyethoxy group, an ethoxyethoxy group, an n-propoxyethoxy group, a isopropoxyethoxy group, an n-butoxyethoxy group, an methoxypropoxy group, a ethoxypropoxy group, an n-propoxypropoxy group, an isopropoxybutoxy group, an n-propoxybutoxy group, a 2-hydroxyethoxyethoxy group, a carboxymethoxy group, a 2-carboxyethoxy group, a 3-carboxypropoxy group, a 3-sulfopropoxy group, a 4-sulfobutoxy group and the like.

As for a substituent which can be substituted with a phenyl group or a naphthyl group of $R^1$ to $R^5$ and A in the general Formulas (1) and (2), examples of an acylamino group include an acetylamino group, a propionylamino group, a butylylamino group, an isobutylylamino group, a benzoylamino group, a naphthoylamino group and the like.

Preferable $R^1$ and $R^2$ in the general Formula (1) include a hydrogen atom, a chlorine atom, a bromine atom, a cyan group, a carboxyl group, a sulfo group, a sulfamoyl group, an n-methylsulfamoyl group, an n-ethylsulfamoyl group, a phosphate group, a nitro group, an acetyl group, a benzoyl group, an ureido group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxyethoxy group, an acetylamino group, a benzoylamino group, and the like, more preferably a hydrogen atom, a chlorine atom, a cyano group, a sulfamoyl group, an acetyl group, a nitro group, a carboxyl group, a sulfo group and a phosphoric acid group, particularly preferably a hydrogen atom, a carboxyl group and a sulfo group.

A preferable group which can be substituted with a phenyl group or a naphthyl group of A in the general Formula (1) includes a hydrogen atom, a chlorine atom, a bromine atom, a cyano group, a carboxyl group, a sulfo group, a sulfamoyl group, an N-methylsulfamoyl group, an N-ethylsulfamoyl group, a phosphoric acid group, a nitro group, an acetyl group, a benzoyl group, an ureide group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxyethoxy group, an acetylamino group, a benzoylamino group and the like, more preferably a hydrogen atom, a cyano group, a methyl group, a methoxy group, a sulfamoyl group, an acetyl group, a nitro group, a carboxyl group, a sulfo group, an N-methylsulfamoyl group, in particular preferably a hydrogen atom, a methoxy group, a solfamoyl group, a nitro group, a carboxyl group, a sulfo group and an N-methylsulfamoyl group.

Preferable $R^3$ to $R^5$ in the general Formula (2) include a hydrogen atom, a chlorine atom, a bromine atom, a cyano group, a carboxyl group, sulfo group, a sulfamoyl group, an N-methylsulfamoyl group, an N-ethylsulfamoyl group, a phosphoric acid group, a nitro group, an acetyl group, a benzoyl group, an ureido group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxyethoxy group, an acetylamino group, a benzoylamino group, and the like, more preferably a hydrogen atom, a cyano group, a methyl group, a methoxy group, a sulfamoyl group, an N-methylsulfamoyl group, an acetyl group, a nitro group, a carboxyl group, a sulfo group, in particular preferably a hydrogen atom, a methoxy group, a sulfamoyl group, a nitro group, a carboxyl group, a sulfo group and an N-methylsulfamoyl group.

The salt shown in the above Formulas (1) and (2) is an inorganic or organic cationic one. A specific example of an inorganic cationic salt includes an alkali metal salt, an alkali earth metal salt and an ammonium salt, preferably a lithium salt, a sodium salt, a potassium salt and an ammonium salt, and an organic cationic salt, for example, includes ones shown in the above Formula (3), which are, however, not especially limited.

Examples of an alkyl group of $Z^1$, $Z^2$, $Z^3$ and $Z^4$ in the general Formula (3) include a methyl group, an ethyl group, an n-propyl group, an isopropyl group, an n-butyl group, an isobutyl group, an sec-butyl group, a tert-butyl group and the like, examples of a hydroxyalkyl group include a hydroxy-(C1 to C4) alkyl group such as a hydroxymethyl group, a hydroxyethyl group, a 3-hydroxypropyl group, a 2-hydroxypropyl group, a 4-hydroxybutyl group, a 3-hydroxybutyl group, 2-hydroxybutyl group, and examples of a hydroxyalkoxyalkyl group include a hydroxy (C1 to C4) alkoxy-(C1 to C4) alkyl group such as a hydroxyethoxymethyl group, a 2-hydroxyethoxyethyl group, 3-hydroxyethoxypropyl group, 2-hydroxyethoxypropyl group, a 4-hydroxyethoxybutyl group, a 3-hydroxyethoxybutyl group, 2-hydroxyethoxybutyl group and the like, preferably a hydroxyethoxy-(C1 to C4) alkyl group among them. Particularly preferable ones are a hydrogen atom; a methyl group; a hydroxy-(C1 to C4) alkyl group such as a hydroxymethyl group, a hydroxyethyl group, a 3-hydroxypropyl group, a 2-hydroxypropyl group, a 4-hydroxybutyl group, a 3-hydroxybutyl group and a 2-hydroxybutyl group and the like; and a hydroxyethoxy-(C1 to C4) alkyl group such as a hydroxyethoxymethyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group, and a 2-hydroxyethoxybutyl group and the like.

Specific examples of $Z^1$, $Z^2$, $Z^3$, and $Z^4$ in the general Formula (3) are shown in the Table 1.

TABLE 1

| Compound No. | $Z^1$ | $Z^2$ | $Z^3$ | $Z^4$ |
| --- | --- | --- | --- | --- |
| 1-1 | H | —$C_2H_4OH$ | —$C_2H_4OH$ | —$C_2H_4OH$ |
| 1-2 | $CH_3$ | —$C_2H_4OH$ | —$C_2H_4OH$ | —$C_2H_4OH$ |
| 1-3 | H | —$CH_2CH(OH)CH_3$ | —$CH_2CH(OH)CH_3$ | —$CH_2CH(OH)CH_3$ |
| 1-4 | $CH_3$ | —$CH_2CH(OH)CH_3$ | —$CH_2CH(OH)CH_3$ | —$CH_2CH(OH)CH_3$ |
| 1-5 | H | —$C_2H_4OH$ | H | —$C_2H_4OH$ |
| 1-6 | $CH_3$ | —$C_2H_4OH$ | H | —$C_2H_4OH$ |
| 1-7 | H | —$CH_2CH(OH)CH_3$ | H | —$CH_2CH(OH)CH_3$ |

TABLE 1-continued

| Compound No. | $Z^1$ | $Z^2$ | $Z^3$ | $Z^4$ |
|---|---|---|---|---|
| 1-8 | CH₃ | —CH₂CH(OH)CH₃ | H | —CH₂CH(OH)CH₃ |
| 1-9 | CH₃ | —C₂H₄OH | CH₃ | —C₂H₄OH |
| 1-10 | CH₃ | —CH₂CH(OH)CH₃ | CH₃ | —CH₂CH(OH)CH₃ |

A trisazo compound according to the present invention shown by Formulas (1) and (2) can be synthesized, for example, by the following method. Examples here are described about the trisazo compound shown by the general Formula (2), however, the trisazo compound shown by the general Formula (1) can be also synthesized by the same method. Structures of the compounds in each step are represented in a free acid form. That is, a compound represented by Formula (4)

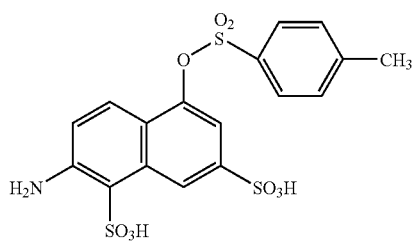

(4)

obtained by a reaction of 2-amino-5-naphthol-1, 7-disulfonic acid and p-toluenesulfonylchloride under alkali condition is diazotized in a conventional manner, this is subjected to a coupling reaction with a compound represented by Formula (5);

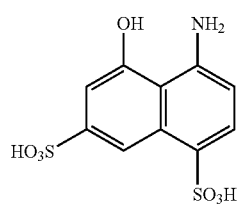

(5)

a produced compound represented by Formula (6)

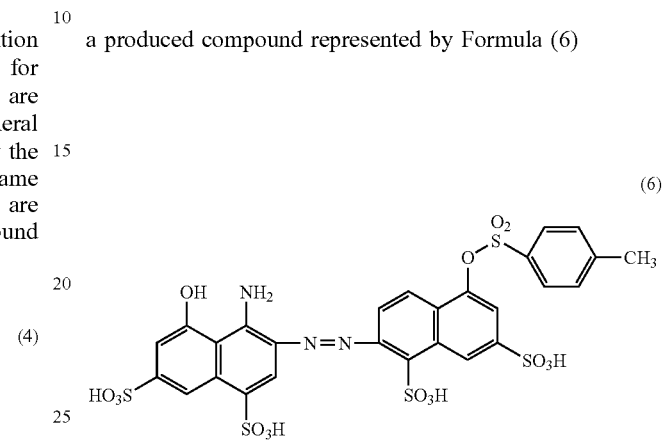

(6)

is subjected to a coupling reaction with a conventionally diazotized compound of the compound represented by Formula (7);

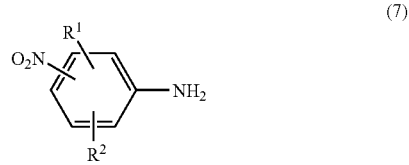

(7)

(Wherein $R^1$ and $R^2$ have the same meaning as described above.) an obtained compound represented in Formula (8)

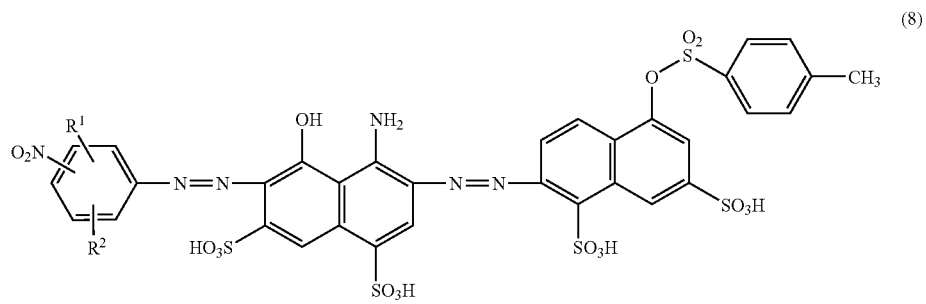

(8)

(Wherein R¹ and R² have the same meaning as described above.) is subjected to hydrolysis under alkali condition, and a compound represented by Formula (9)

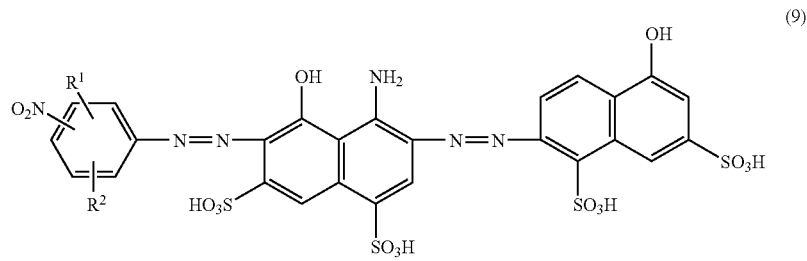

(9)

(Wherein R¹ and R² have the same meaning as described above.) is obtained. This is subjected to a coupling reaction with a conventionally diazotized compound of the compound represented by the general Formula (10)

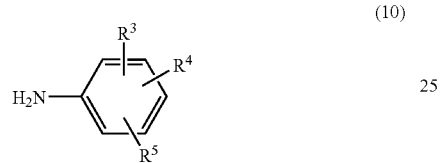

(10)

(Wherein R³, R⁴ and R⁵ have the same meaning as described above.) to obtain a trisazo compound by the general Formula (2) according to the present invention presented.

Suitable examples of the compound shown in the general Formula (1) are not particularly limited, but typical compounds having the following structural Formulas are included.

TABLE 2

| Compound No. | Structural Formula |
| --- | --- |
| 1 | |
| 2 | |
| 3 | |

TABLE 2-continued
| Compound No. | Structural Formula |
| --- | --- |
| 4 | 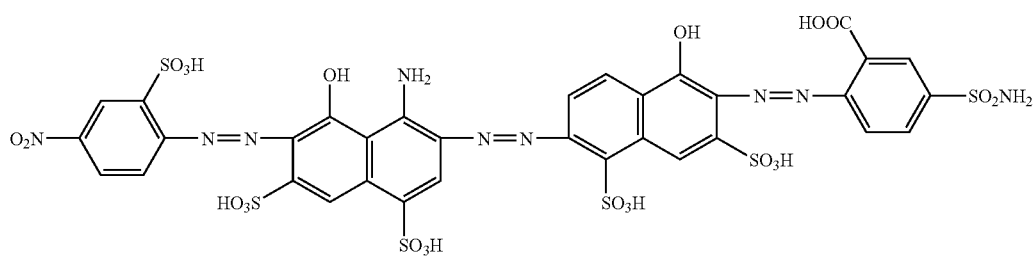 |
| 5 | 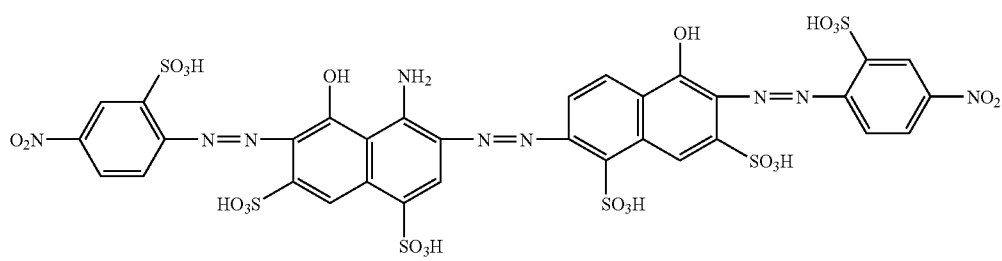 |
| 6 | 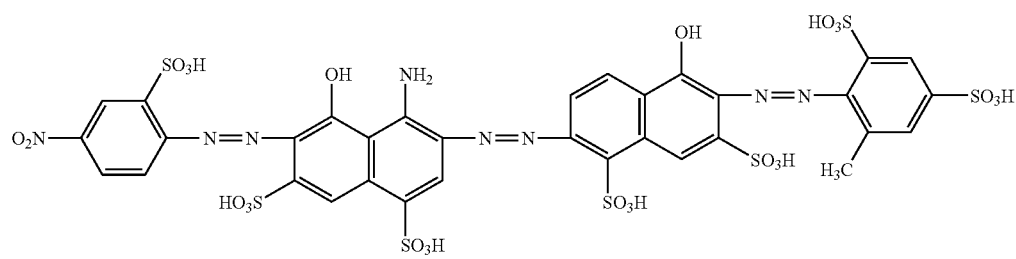 |
| 7 | 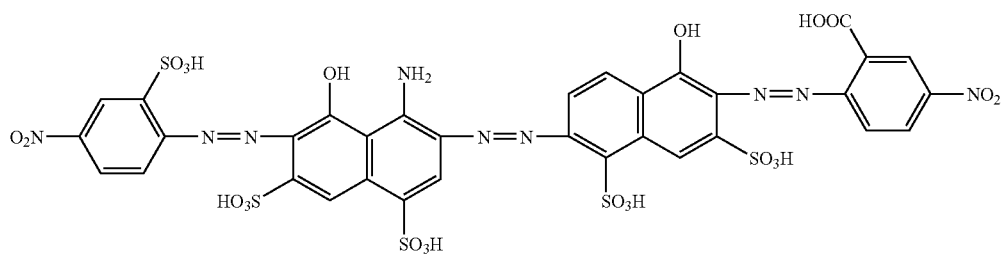 |
| 8 | 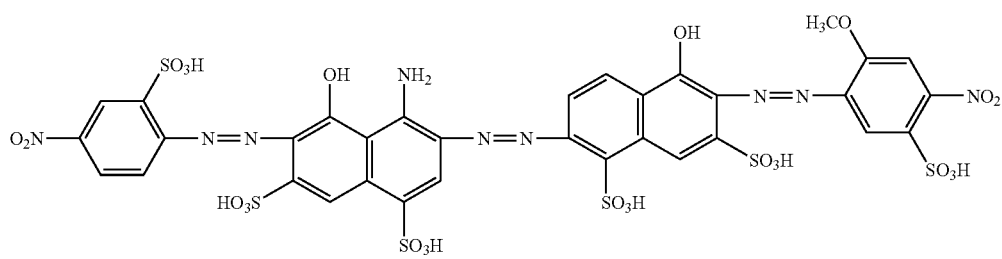 |

TABLE 3

| Compound No. | Structural Formula |
|---|---|
| 9 | |
| 10 | |
| 11 | |
| 12 | |
| 13 | |
| 14 | |

TABLE 3-continued

| Compond No. | Structural Formula |
|---|---|
| 15 | |
| 16 | |

TABLE 4

| Compound No. | Structural Formula |
|---|---|
| 17 | |
| 18 | |
| 19 | |

TABLE 4-continued

| Compound No. | Structural Formula |
|---|---|
| 20 | (structure) |
| 21 | (structure) |
| 22 | (structure) |
| 23 | (structure) |

TABLE 5

| Compound No. | Structural Formula |
|---|---|
| 24 | (structure) |

TABLE 5-continued

| Compound No. | Structural Formula |
| --- | --- |
| 25 | |
| 26 | |
| 27 | |
| 28 | |
| 29 | |

TABLE 5-continued

| Compound No. | Structural Formula |
| --- | --- |
| 30 | (structure shown) |

Synthesis of the compound of Formula (4) by the reaction of 2-amino-5-naphtol-1,7-disulfonic acid and p-toluene-sulphonylchloride is carried out by a known method per se, favorably conducted, for example, in an aqueous or aqueous organic medium, at 20 to 100° C. for example, preferably 30 to 80° C., at neutral or alkaline pH value. It is carried out preferably at weakly alkaline pH value, for instance, pH 8 to 11. The pH is controlled by the addition of a base. As the base, for example, a hydroxide of an alkali metal such as lithium hydroxide and sodium hydroxide, and a carbonate salt of an alkyl metal such as lithium carbonate, sodium carbonate and potassium carbonate and the like can be used. P-toluenesulfonylchloride is used in the amount of 1 to 1.5 times mol based on the mol amount of 2-amino-5-naphtol-1,7-disulfonic acid.

Diazotization of the compound in Formula (4) is carried out by a known method per se, for example, in an inorganic acid medium, at a temperature of −5 to 30° C. for example, preferably 5 to 15° C., using a nitrite salt, for example, an alkali metal nitrite such as a sodium nitrite. A coupling of a diazotized compound of Formula (4) with a compound of Formula (5) is also carried out under known conditions per se. It is advantageous to carry out the reaction in an aqueous or aqueous organic medium, for example, at a temperature of −5 to 30° C., preferably 5 to 20° C., and at acidic to neutral pH value. A coupling bath is acidified, however, carried out preferably at acidic to weakly acidic pH value, for instance, pH 1 to 4. The pH value is controlled by the addition of a base. As a base, a hydroxide of an alkali metal such as lithium hydroxide and sodium hydroxide, a carbonate salt of an alkali metal such as lithium carbonate, sodium carbonate, and potassium carbonate, an acetate salt such as sodium acetate, an ammonia or an organic amine and the like can be used. A compound of Formula (4) and a compound of Formula (5) are used in nearly stoichiometric amounts.

Diazotization of the compound in Formula (7) is also carried out by a known method per se, for example, in an inorganic acid medium, at a temperature of −5 to 30° C. for example, preferably 0 to 15° C., using a nitrite salt, for example, an alkali metal nitrite such as sodium nitrite. A coupling of a diazotized compound of Formula (7) with a compound of Formula (6) is also carried out under known conditions per se. It is advantageous to carry out the reaction in an aqueous or aqueous organic medium, for example, at a temperature of −5 to 30° C., preferably 10 to 25° C., and at weakly acidic to alkaline pH value. It is preferable to carry out at weakly acidic to weakly alkaline pH value, for example, pH 5 to 10, which is controlled by the addition of a base. As the base, for example, a hydroxide of an alkali metal such as lithium hydroxide and sodium hydroxide, and a carbonate of an alkali metal such as lithium carbonate, sodium carbonate and potassium carbonate, an acetate such as a sodium acetate, or an ammonia or an organic amine and the like can be used. A compound of Formula (6) and a compound of Formula (7) are used in nearly stoichiometric amounts.

Production of a compound of the general Formula (9) by hydrolysis of a compound of Formula (8) is also carried out by a known method per se. Such a method is advantageous as heating in aqueous alkali medium, for example, by adjusting pH value at 9.5 or more by the addition of a sodium hydroxide or a potassium hydroxide to a solution containing a compound of the general Formula (8), followed by heating up to a temperature of 20 to 150° C. for example, preferably 30 to 100° C. The pH value of the reaction solution at this point is preferably maintained at 9.5 to 11.5. The pH value is controlled by the addition of a base. The above described base can be used.

Diazotization of the compound in the general Formula (10) is also carried out by a known method per se, for example, in an inorganic acid medium, at a temperature of −5 to 30° C. for example, preferably 0 to 15° C., using a nitrite salt, for example, alkali metal nitrite such as sodium nitrite. A coupling of a diazotized compound of the general Formula (10) with a compound of Formula (9) is also carried out under known conditions per se. It is advantageous to carry out in an aqueous or aqueous organic medium, for example, at a temperature of 5 to 40° C., preferably 10 to 25° C., and at weakly acidic to alkaline pH value. It is preferably carried out at neutral to alkaline pH value, for example, pH 5 to 10, which is controlled by the addition of a base. As the base, a hydroxide of an alkali metal such as lithium hydroxide and sodium hydroxide, a carbonate salt of an alkali metal such as lithium carbonate, sodium carbonate and potassium carbonate, an acetate salt such as sodium acetate, or an ammonia or an organic amine and the like can be used. A compound of the general Formula (9) and a compound of the general Formula (10) are used in nearly stoichiometric amounts.

A trisazo compound according to the present invention shown in the general Formula (1) or a salt thereof (hereinafter, the compound or a salt thereof is referred to the compound simply), after a coupling reaction, can be isolated in a free acid form by the addition of a mineral acid, and then washed with water or acidified water to eliminate inorganic salt. Thus obtained acidic-type colorant having a low percentage salt content can be a corresponding salt solution by neutralization with an optional inorganic or organic base in an aqueous medium. Examples of an inorganic base include, for example, a hydroxide of an alkali metal such as lithium hydroxide, sodium hydroxide and potassium hydroxide, an ammonium hydroxide, or a carbonate salt of an alkali metal such as lithium carbonate, sodium carbonate and potassium carbonate, and examples of an organic base include an organic amine, for example, an alkanolamine such as diethanolamine and triethanolamine, however, not limited thereto.

Ink composition according to the present invention will be described. An aqueous composition comprising the trisazo compound according to the present invention represented by the above general Formula (1) can dye materials consisting of cellulose. The aqueous composition can also dye other materials having a carboxyamide bond, and can be used widely for dyeing leather, cloth, and paper. On the other hand, typical use of the compound according to the present invention includes an ink composition produced by dissolving in a liquid medium.

A reaction solution containing a trisazo compound shown by the above general Formula (1) according to the present invention can be directly used to produce an ink composition. Otherwise, this solution can be first subjected to drying, for example, spray drying to be isolated; salting out with inorganic salts such as sodium chloride, potassium chloride, calcium chloride and sodium sulfate; aciding out with mineral acid such as hydrochloric acid, sulfuric acid and nitric acid; or aciding-salting out which is a combination of the above described salting-out and aciding-out, so as to derive an azo compound according to the present invention, which can be then processed into an ink composition.

The ink composition according to the present invention is a composition, wherein water is a main medium comprising usually 0.1 to 20 mass %, preferably 1 to 10 mass %, and more preferably 2 to 8 mass % of a trisazo compound shown by the general Formula (1) according to the present invention. The ink composition according to the present invention may comprise water-soluble organic solvent of, for example, 0 to 30 mass %, and ink modifier of, for example, 0 to 5 mass %. In this connection, the ink composition, on the point of improving storage stability, has preferably pH 5 to 11, more preferably pH 7 to 10. The colored composition has preferable surface tension of 25 to 70 mN/m, more preferably 25 to 60 mN/m. Furthermore, the colored composition has viscosity of preferably not higher than 30 mPa·s, more preferably not higher than 20 mPa·s.

The composition according to the present invention is a trisazo compound shown by the above general Formula (1) dissolved in water or water-soluble organic solvent (water containing organic solvent or organic solvent which can be mixed with water), followed by the addition of an ink modifier if necessary. When the ink composition is used as an ink for an ink-jet printer, it is preferable to use a trisazo compound containing less inorganic materials such as a chloride of metal cation, a sulfate salt and the like, and a guideposts of the content is, for example, not more than about 1 mass % (based on the colorant technical product). To produce a less inorganic trisazo compound, for example, desalting treatment methods may be conducted by a method such as an ordinary reverse osmosis method or a method by which a dried material or a wet cake of a trisazo compound according to the present invention is stirred in a mixed solvent of an alcohol such as methanol and water, filtered, and dried.

A water-soluble organic solvent which can be used in preparation of said ink composition includes, for example, a (C1 to C4) alkanol such as methanol, ethanol, propanol, isopropanol, butanol, isobutanol, sec-butanol and tert-butanol; a carboxylic acid amide such as N,N-dimethylformamide and N,N-dimethylacetamide; a lactam such as 2-pyrrolidone and N-methylpyrrolidine-2-one; a cyclic urea such as 1,3-dimethylimidazolidine-2-one or 1,3-dimethylhexahydropyrimide-2-one; a ketone or a ketoalcohol such as acetone, methyl ethyl ketone and 2-methyl-2-hydroxypentane-4-one; a cyclic ether such as tetrahydrofuran and dioxane; a mono-, oligo- or polyalkylene glycol or thio glycol having (C2 to C6) alkylene units such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thio diglycol and dithio diglycol; a polyol (triol) such as glycerin, and hexane-1,2,6-triol; a (C1 to C4) alkyl ether of a polyhydric alcohol such as ethylene glycol monomethyl ether, ethylene glycol monoethyl ether, diethylene glycol monomethyl ether, diethylene glycol monoethyl ether, triethylene glycol monomethyl ether and triethyleneglycol monoethyl ether; γ-butylolactone; dimethylsulfoxide; and the like. These organic solvents may be used alone or in a combination of tow or more kinds thereof.

In preparing the above ink composition, an ink modifier to be used includes, for example, an antiseptic and fungicide, a pH controller, a chelating agent, an antirust agent, a water-soluble ultraviolet absorber, a water-soluble polymer, a dye-dissolving agent, an antioxidant and a surfactant. The specific examples will be explained.

The above fungicide includes sodium dehydroacetate, sodium benzoate, sodium pyridinethione-1-oxide, ethyl p-hydroxybenzoate, 1,2-benzisothiazoline-3-one and a salt thereof. These fungicides of 0.02 to 1.00 mass % are preferably used in a colored composition.

The antiseptic includes a compound of, for example, an organic solfur base, an organic nitrogen sulfur base, an organic halogen base, a haloallylsulfone base, an iodopropargyl base, an N-haloalkylthio base, a benzothiazole base, a nitrile base, a pyridine base, an 8-oxyquinoline base, a benzothiazole base, an isothiazoline base, a dithiol base, a pyridineoxide base, a nitropropane base, an organotin base, a phenol base, a quaternary ammonium salt base, a triazine base, a thiazine base, an anilide base, an adamantane base, a dithiocarbamate base, a brominated indanone base, a benzybromoacetate base and an inorganic salt base. The compounds of an organic halogen base include, for example, sodium pentachlorophenol, the compounds of a pyridineoxide base include, for example, sodium 2-pyridinethiol-1-oxide, and an inorganic salt base include, for example, sodium acetic anhydride, and the compounds of an isothiazoline base include, for example, 1,2-benzisothiazoline-3-one, 2-n-octyl-4-isothiazolone-3-one, 5-chloro-2-methyl-4-isothiazoline-3-one, 5-chloro-2-methyl-4-isothiazoline-3-one magnesium chloride, 5-chloro-2-methyl-4-isothiazoline-3-one calcium chloride, 2-methyl-4-isothiazoline-3-one calcium chloride and the like.

As a pH controller, any substance can be used as long as it can control pH of an ink in the range of, for example, 5 to 11, without impairing the ink to be formulated. An example of the pH controller includes an alkanolamine such as diethanolamine, triethanolamine and N-methyidiethanolamine; a hydroxide of an alkali metal such as lithium hydroxide, sodium hydroxide and potassium hydroxide; an ammonium hydroxide (ammonia); a carbonate salt of an alkali metal such as lithium carbonate, sodium carbonate, sodium hydrogencarbonate and potassium carbonate; potassium acetate; an inorganic base such as sodium silicate and disodium phosphate; and the like.

The chelating agent includes, for example, sodium ethylenediamine tetraacetate, sodium nitrilo triacetate, sodium hydroxyethylethylenediamine triacetate, sodium diethylenetriamine pentaacetate, sodium uracil diacetate and the like.

The antitrust agent includes, for example, an acidic sulfite salt, sodium thiosulfate, ammonium thioglycolate, diisopropyl ammomium nitrite, pentaetythritol tetranitrate, dicyclohexyl ammonium nitrite and the like.

The water-soluble ultraviolet absorber includes, for example, a sulfonated benzophenone-based compound, a benzotriazole-based compound, a salicyclic-acid-based compound, a cinnamic-acid based compound and a triazine-based compound.

The water-soluble polymer includes polyvinyl alcohol, a cellulose derivative, a polyamine, a polyimine, and the like.

The dye-dissolving agent includes, for example, ε-caprolactam, ethylene carbonate, urea and the like.

As antioxidant, for example, various organic or metal-complex-based fading inhibitors can be used. The above organic fading inhibitors include hydroquinones, alkoxyphenols, dialkoxyphenols, phenols, anilines, amines, indans, chromans, alkoxyanilines, heterocycles and the like.

The surfactant includes known surfactants such as an anionic, cationic and nonionic surfactant. The anionic surfactant includes an alkyl sulfonic acid, alkyl carboxylic acid salt, α-olefin sulfonic acid salt, polyoxyethylene alkyl ether acetic acid salt, N-acylamino acid and a salt thereof, N-acyl-methyltaurine salt, rosin acid soap, caster oil sulfuric acid ester salt, lauryl alcohol sulfuric acid ester salt, alkylphenol-type phosphate, alkyl-type phosphate, alkylallyl sulfonate, diethylsulfo succinic acid salt, diethylhexylsulfo succinic acid salt, dioctylsulfo succinic acid salt and the like. The cationic surfactant includes a 2-vinylpyridine derivative, a poly 4-vinylpyridine derivative and the like. The ampholytic surfactant includes laurydimethylamino acetic acid betaine, 2-alkyl-N-carboxymethyl-N-hydroxyethylimidazolinium betaine, coconut oil fatty acid amide propyldimethylamino acetic acid betaine, polyoctylpolyaminoethylglycine, an imidazoline derivative, and the like. The nonionic surfactant includes ethers such as polyoxyethylene nonyl phenyl ether, polyoxyehtylene octyl phenyl ether, polyoxyehtylene dodecyl phenyl ether, polyoxyethylene oleyl ether, polyoxyethylene lauryl ether, polyoxyethylene alkyl ether and polyoxyallylkyl alkyl ether; esters such as polyoxyethylene oleic acid, polyoxyethylene oleate, polyoxyethylene distearate, sorbitan laurate, sorbitan monostearate, sorbitan monooleate, sorbitan sesquiorate, polyoxyethylene monooleate and polyoxyethylene stearate; and acetylene glycols such as 2,4,7,9-tetramethyl-5-decyne-4,7-diol, 3,6-dimethyl-4-octyne-3,6-diol and 3,5-dimethyl-1-hexyne-3-ol (for example, Surfynol 104, 105, 82, 465, and Olfine STG from Nissin Chemical Industry Co., Ltd.). These ink modifiers are used alone or in mixture thereof.

The ink composition according to the present invention is obtained by mixing and stirring the above ingredients in arbitrary order. Thus obtained ink composition may be filtered with a membrane filter to remove impurities. To adjust black tones, other colorant having various hues may be mixed. In that case, other than the azo compound according to the present invention shown by the general Formula (1), colorant of black, yellow, magenta, cyan and other colors having other hues can be used.

An ink composition according to the present invention can be used in various fields, and is suitable for a water-base ink for writing, a water-base printing ink, an information recording ink, and the like, particularly preferably for an ink for ink-jet printing containing the ink composition, and suitably used in an ink-jet recording method described later.

In a method for ink-jet recording, the ink composition according to the present invention can be used together with a yellow ink composition, a magenta ink composition and cyan ink composition. An ink composition of each color is injected into each container.

The ink-jet printer according to the present invention is an ink-jet printer with which containers containing ink compositions are charged in the predetermined positions.

In an applicable ink-jet recording method, an ink for ink-jet recording containing the above ink composition is used for recording on an image receiving material, and an ink nozzle and the like to be used in this case are not especially limited and can be selected as appropriate according to the purpose, and known methods such as an electric charge controlling method to discharge ink utilizing static induction force, a drop-on-demand method (pressure pulse method) to make use of vibration pressure of piezoelectric elements, an acoustic ink-jet method to discharge ink by radiation pressure of acoustic beams converted from electric signals and by irradiation of ink, a thermal ink-jet method (Bubble Jet (registered trademark)) to make use of pressure of bubbles generated by heating ink, and the like can be used. The above ink-jet recording method also includes a method for injecting a number of tiny droplets of a low concentration ink called a photo ink, a method for improving image quality using multiple inks having substantially the same hue and different concentration, and a method for using a colorless and transparent ink.

The colored object according to the present invention is a colored object with the above compound according to the present invention or an ink composition comprising thereof, more preferably one colored by an ink-jet printer using the ink composition according to the present invention. Materials which can be colored include, for example, information transmission sheet such as paper, film and the like, textile or cloth (cellulose, nylon, wool and the like), leather, substrates for color filter and the like. An information transmission sheet is preferably subjected to surface treatment, specifically provided an ink receiving layer on the substrate of paper, synthetic paper, film and the like. An ink receiving layer is provided, for example, by impregnating or coating cationic polymer on the above substrate, or by coating inorganic particles that can absorb colorant in the ink of porous silica, aluminasol or special ceramics and the like on the surface of the above substrate together with a hydrophilic polymer such as polyvinylalcohol, polyvinylpyrrolidone and the like. Such objects as provided with an ink receiving layer are usually called paper for exclusive ink-jet use (film), glossy paper (film) and the like, including, as typical commercial items for example, Pictorico (manufactured by Asahi Glass Co., Ltd.); Professional Photopaper, Super Photopaper, and Mat Photopaper (all manufactured by Canon Inc.), a paper for PM photograph (glossy), a paper for PM mat (both manufactured by SEIKO-EPSON Co., Ltd.); Premium Plus Photo Paper, Premium Glossy Film and Photo Paper (all manufactured by Hewllet Packard Company, Japan); PhotoLikeQP (manufactured by KONICA MINOLTA Japan); and the like. In addition, plain paper can naturally be used.

A trisazo compound according to the present invention is excellent in water-solubility, and an ink composition containing this trisazo compound according to the present invention does not appear crystal deposition change in physical property, nor color change and the like after storage for a long period of time, and exhibit favorable storage stability. And a black ink liquid for recording which comprises a trisazo compound according to the present invention is used for ink-jet recording and for writing tools, and when a printing is recorded on a plain paper and a paper exclusive use for ink-jet, black where printing density is high is exhibited and are excellent in ozone fastness, light fastness, moisture fastness and color rending properties.

EXAMPLES

Hereinafter, the present invention will be more specifically explained by Examples, but the present invention should not be limited thereto. In this connection, "part" and "%" in the specification are based on mass unless otherwise specified. Carboxyl groups and sulfo groups are represented in a free acid form.

Example 1-1

After 20.1 part of 2-amino-5-naphthol-1,7-disulfonic acid and 12.6 part of p-toluenesulfonylchloride were subjected to reaction at pH 8.0 to 8.5, at 70° C. for 1 hour, 28.4 part of the compound of Formula (4) obtained by salting out in acidic and filtering was dissolved in 300 part of water while controlling pH at 6.0 to 8.0 with sodium carbonate, and thereafter, diazotized by adding 18.7 part of 35% hydrochloric acid, and at 0 to 5° C., 10.7 part of 40% aqueous solution of sodium nitrite.

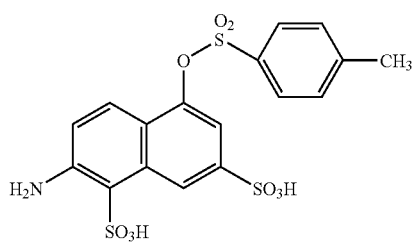

(4)

This diazo suspension was added with solution of 19.1 part of 4-amino-5-hydroxynaphthalene-1,7-disulfonic acid suspended in 200 part of water, followed by stirring for 12 hours while maintaining pH thereof at 2.4 to 2.8 with sodium carbonate, at 10 to 20° C. After stirring, dissolved while adjusting pH at 7.0 to 8.5 with sodium carbonate, a solution containing a mono azo compound of Formula (6) was obtain.

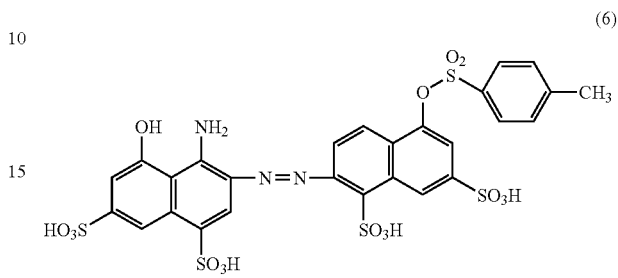

(6)

14.4 part of sodium 4-nitroaniline-2 sulfonate was dissolved in 150 part of water, herein followed by the addition of 18.8 part of 35% hydrochloric acid and 10.6 part of a solution of 40% sodium nitrite at 0 to 5° C. to be diazotized. This diazo suspension was added dropwise into a solution containing a mono azo compound of Formula (6) obtained by the above reaction while maintaining pH thereof at 8.0 to 9.0 with sodium carbonate at 10 to 20° C. After completion of the dropwise addition, by stirring at pH 8.0 to 9.0, at 15 to 30° C. for 2 hours followed by salting out by the addition of sodium chloride and filtering, a wet cake containing a compound of Formula (1-8) was obtained.

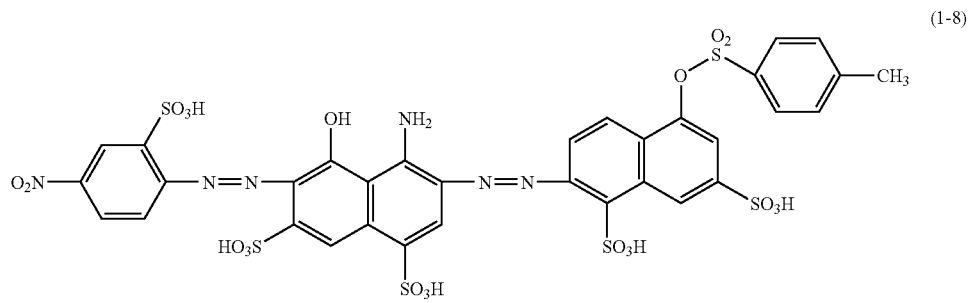

(1-8)

The above obtained wet cake was dissolved in 400 part of water and heated to 70° C., followed by stirring for 1 hour while maintaining pH at 10.5 to 11.0 with sodium hydroxide. After cooled to room temperature, by adjusting pH at 7.0 to 8.0 with 35% hydrochloric acid, salting out by the addition of sodium chloride, and filtering, a wet cake containing a compound of Formula (1-9) was obtained.

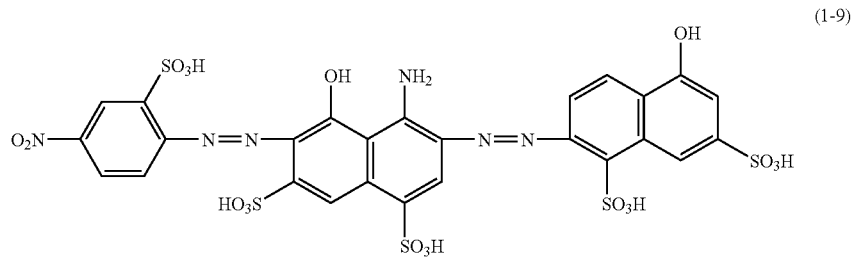

(1-9)

11.0 part of 4-methoxyaniline-2-sulfonic acid was dissolved in 100 part of water at pH 5.0 to 7.0 by the addition of sodium hydroxide, herein followed by the addition of 15.8 part of 35% hydrochloric acid and 9.6 part of 40% sodium nitrite at 0 to 5° C. to be diazotized. The diazo suspension was added dropwise, at 15 to 30° C., maintaining pH thereof at 8.0 to 9.0 with sodium carbonate, into a solution where a wet cake containing the above obtained compound of Formula (1-9) was dissolved in 300 part of water while controlling pH at 8.0 to 9.0 with sodium hydroxide at 15 to 30° C. After the end of the dropwise addition, stirring was conducted at 15 to 30° C. for 3 hours at pH value of 8.0 to 9.0 to complete the coupling reaction, followed by the addition of sodium chloride for salting out and filtration. The obtained wet cake was dissolved in 220 part of water, crystallized by adding 300 part of methanol, and filtered. Furthermore, the obtained wet cake was dissolved in 150 part of water, then pH adjusted at no more than 0.5 by adding 35% hydrochloric acid, followed by the addition of lithium hydroxide to be dissolved. This solution was crystallized by adding 200 part of methanol and 50 part of 2-propanol, filtered and dried to obtain 38.0 part of a compound (a compound of No. 1 in Table 2) of Formula (11) according to the present invention. The maximum absorption wavelength in water ($\lambda$max) of this compound was 595 nm, and solubility in water was no less than 100 g/l.

Example 1-3

The same method as in Example 1-1 was conducted except that 9.8 part of 2-aminoterephthalic acid instead of 11.0 part of 4-methoxyanilin-2-sulfonic acid in Example 1-1 was used, to obtain 30.4 part of a compound (a compound of No. 3 in Table 2) of Formula (13) according to the present invention. The maximum absorption wavelength in water ($\lambda$max) of this compound was 590 nm, and solubility in water was no less than 100 g/l.

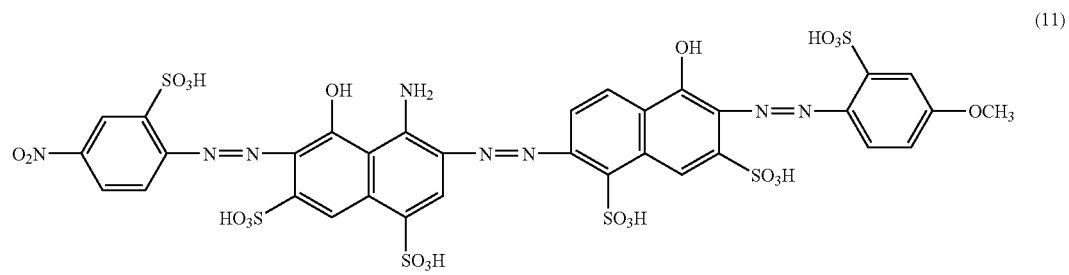

Example 1-2

The same method as in Example 1-1 was conducted except that 11.7 part of 5-sulfoanthranylic acid instead of 11.0 part of 4-methoxyaniline-2-sulfonic acid in Example 1-1 was used, to obtain 36.2 part of a compound (a compound of No. 2 in Table 2) of Formula (12) according to the present invention. The maximum absorption wavelength in water ($\lambda$max) of this compound was 591 nm, and solubility in water was no less than 100 g/l.

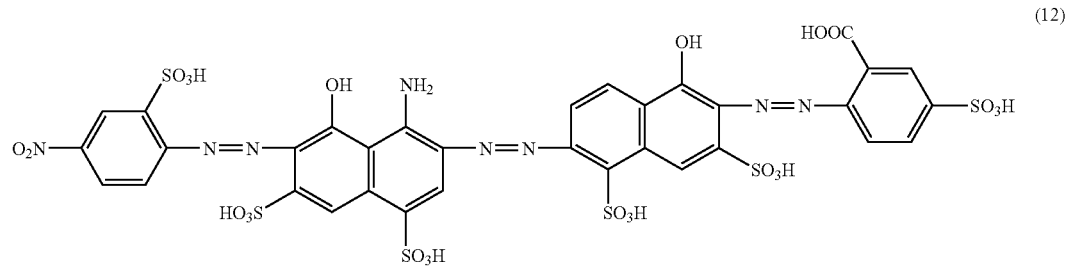

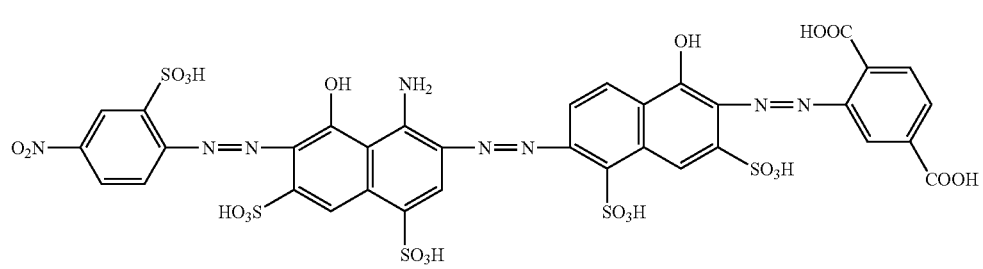

Example 1-4

Example 1-6

The same method as in Example 1-1 was conducted except that 12.4 part of 5-(-N-methylsulfamoyl)anthranilic acid instead of 11.0 part of 4-methoxyanilin-2-sulfonic acid in Example 1-1 was used, to obtain 32.3 part of a compound (a compound of No. 9 in Table 3) of Formula (16) according to the present invention. The maximum absorption wavelength in water ($\lambda$max) of this compound was 592 nm, and solubility in water was no less than 100 g/l.

Example 1-5

The same method as in Example 1-1 was conducted except that 11.7 part of 5-sulfamoylanthranilic acid instead of 11.0 part of 4-methoxyanilin-2-sulfonic acid in Example 1-1 was used, to obtain 31.8 part of a compound (a compound of No. 4 in Table 2) of Formula (14) according to the present invention. The maximum absorption wavelength in water ($\lambda$max) of this compound was 591 nm, and solubility in water was no less than 100 g/l.

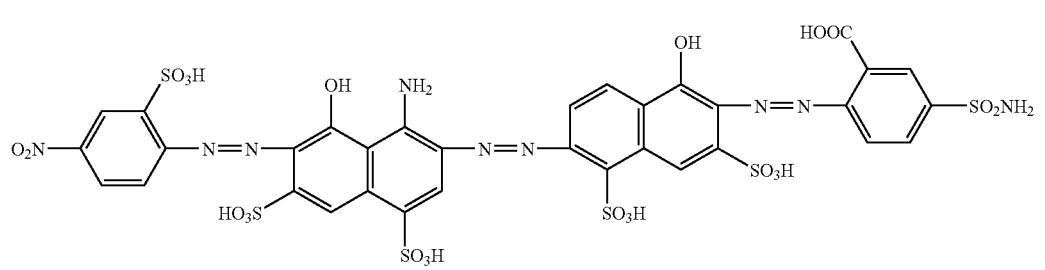

Example 1-5

The same method as in Example 1-1 was conducted except that 12.9 part of sodium 4-nitroaniline-2 sulfonate acid instead of 11.0 part of 4-methoxyanilin-2-sulfonic acid in Example 1-1 was used, to obtain 37.8 part of a compound (a compound of No. 5 in Table 2) of Formula (15) according to the present invention. The maximum absorption wavelength in water ($\lambda$max) of this compound was 594 nm, and solubility in water was no less than 100 g/l.

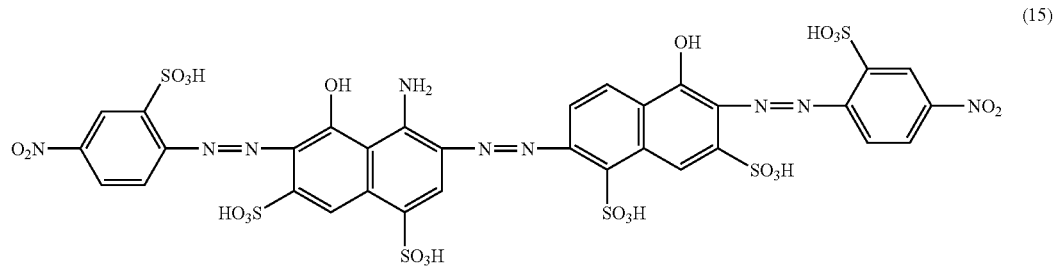

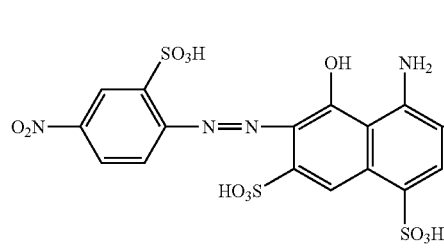
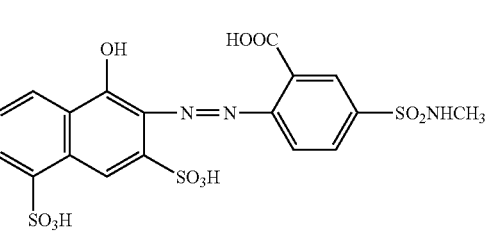

(16)

Example 1-7

The same method as in Example 1-1 was conducted except that 18.8 part of 3-amino-7-nitronaphthalene-1,5-disulfonic acid instead of 11.0 part of 4-methoxyanilin-2-sulfonic acid in Example 1-1 was used, to obtain 30.9 part of a compound (a compound of No. 20 in Table 4) of Formula (17) according to the present invention. The maximum absorption wavelength in water (λmax) of this compound was 591 nm, and solubility in water was no less than 100 g/l.

1-10, the compound of Formula (14) for Example 1-11, and the compound of Formula (15) for Example 1-12. On preparing an ink, pH was adjusted to 8 to 10 with lithium hydroxide. This water-based ink composition did not cause precipitation separation during storage thereof, and did not generate changed physical property after storage for a long period of time.

(B) Ink-jet Printing

Using each ink composition obtained above, by an ink-jet printer (Trade name BJ-S630 from Canon Inc.), ink-jet

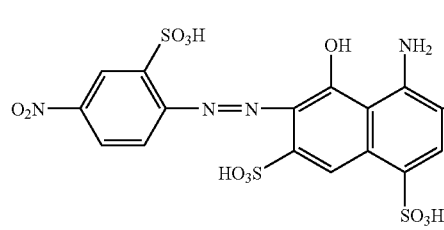

(17)

Example 1-8 to 1-12

(A) Production of an Ink

An ink composition according to the present invention was prepared by mixing each component described below, followed by filtering with a 0.45 μm membrane filter to remove impurities. Ion exchange water was used as water. In this connection, water and lithium hydroxide was added in order that the ink composition had pH=8.0 to 10.0.

TABLE 6

| | |
|---|---|
| Each compound obtained in the above examples | 5.0 part |
| Glycerin | 5.0 part |
| Urea | 5.0 part |
| N-methyl-2-pyrolidone | 4.0 part |
| Isopropylalcohol | 3.0 part |
| Butylcarbitol | 2.0 part |
| Surfactant (Surfynol105 manufactured by Nissin Chemical Industry Co., Ltd.) | 0.1 part |
| Water + lithium hydroxide | 75.9 part |
| Total | 100.0 part |

In Table 6, "Each compound obtained in the above Examples" means respectively the compound of Formula (11) for Example 1-8, the compound of Formula (12) for Example 1-9, the compound of Formula (13) for Example recording was conducted on three types of paper of a Plain Paper (LBP PAPER LS-500 from Canon Inc.), Professional Glossy Paper A (Professional Photopaper PR-101 from Canon Inc.), and Professional Glossy Paper B (a paper for PM photograph (glossy), KA420PSK of Epson Co., Ltd.).

On printing, an image pattern was made so as to obtain gradations of several stages in reflection density, and a black colored print of half tone was obtained. As a gray scale mode is used on printing, at this pale colored part, each recording solution of yellow, cyan, and magenta is not used together besides a black colored recording solution. Among testing methods described below, in evaluation of printing density which is an item to be evaluated using a calorimeter, on measuring reflection density, D value, of a print, the highest portion of this D value was used. Further, on measuring in a test of light fastness and a test of ozone gas fastness which are similarly items to be evaluated using a calorimeter, measurement was conducted using a portion of gradations wherein reflection density, D value, of a print before testing is closest to 1.0.

(C) Evaluation of a Recorded Image

Concerning a recorded image according to a water-based ink composition of the present invention, evaluation was conducted on 3 items, that is, printing density, change in density and hue after light fastness testing, and change in hue after ozone gas fastness testing. In this connection, the ozone gas fastness test and the moisture fastness test were conducted using only Professional Glossy Papers A and B. The results are shown in Table 7. The testing methods are shown below. Furthermore, a part of a testing piece, not put into the evaluation tester, was kept to be a testing piece "before testing" for evaluations of the tests explained as follows.

(1) Evaluations of Printing Density

Hue density of a recorded image was measured using Gretag Macbeth SpectroEye (from GRETAG Co., Ltd.), and printing density D value was calculated. Judgment criteria are shown below.

○: a Plain Paper: 1.2≦D, a Glossy Paper: 2.2≦D
Δ: a Plain Paper: 1.0≦D<1.2, a Glossy Paper: 1.9≦D<2.2
×: a Plain Paper: D<1.0, a Glossy Paper: D<1.9

(2) Light Fastness Test

Using a xenon weatherometer Ci4000 (from ATLAS Co., Ltd.), a testing piece was irradiated for 50 hours at illuminance of 0.36 W/m². After the test, using the above described coloirmetry system, color difference (ΔE) and percentage reduction of hue density before and after the test were measured. Judgment was conducted by the guideposts as shown below.

○: ΔE is lower than 5, and percentage reduction is 90% or more
Δ: only either one of ΔE or percentage reduction does not satisfy the above conditions for ○
×: ΔE is 5 or more, and percentage reduction is lower than 90%

(3) Ozone Gas Fastness Test

As testing pieces for ozone gas fastness testing, two pieces for each print sample, one for a three-hour test and the other for six-hour test, were prepared. Using an ozone weatherometer (from Suga Testing Machine Co., Ltd.), a print sample was left under ozone concentration of 40 ppm, humidity of 60% RH and temperature of 24° C. Each one of the samples was left for three hours and the other of the samples was left for six hours. After the test, colorimetry was conducted using the above described color measuring system and color difference (ΔE) and percentage reduction of hue density before and after the test were measured. Judgment was conducted by the guideposts as shown below.

○: ΔE is lower than 10 when testing for three hours, and ΔE is lower than 20 when testing for six hours
Δ: ΔE is 10 or more when testing for three hours, and ΔE is 20 or more when testing for six hours
×: ΔE is 10 or more when testing for three hours, and ΔE is 20 or more when testing for six hours Comparative Example 1-1

Using, for comparison, a colorant (the following Formula (18)) of 1 in Table 1-1 described in Patent Literature 1 as a colorant for water-soluble ink-jet, an ink composition was prepared by the same ink-composition as in Example 1-8. The obtained evaluation results of printing density, light fastness, and ozone gas fastness of a recorded image are shown in Table 7.

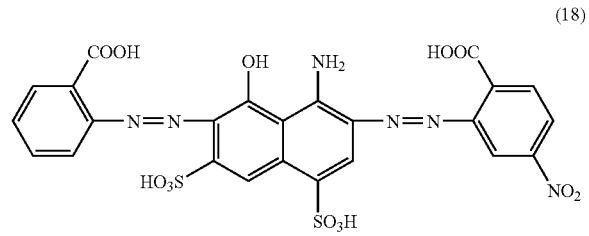

Comparative Example 1-2

Similarly, using, for comparison, a colorant AN-250 (the following Formula (19)) described in Example 1 of Patent Literature 3 as a colorant for a water-soluble ink-jet, an ink composition was prepared by the same ink-composition as in Example 1-8. The evaluation results of printing density, light fastness, and ozone gas fastness of a recorded image obtained are shown in Table 7.

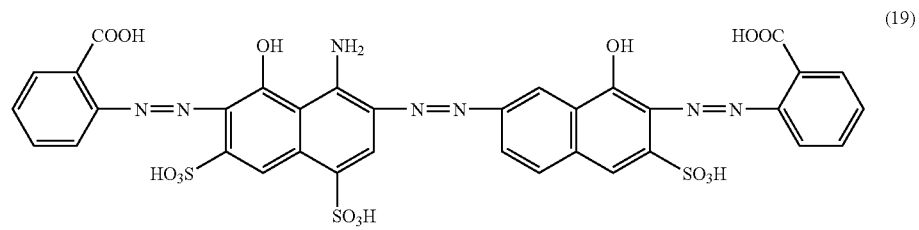

TABLE 7

|  |  | Printing density | Light fastness | Ozone gas fastness |
|---|---|---|---|---|
| Example1-8 | Plain Paper | ○ | ○ | — |
| Formula(11) | Professional Glossy Paper A | ○ | ○ | ○ |
|  | Professional Glossy Paper B | ○ | ○ | ○ |
| Example1-9 | Plain Paper | ○ | ○ | — |
| Formula(12) | Professional Glossy Paper A | ○ | ○ | ○ |
|  | Professional Glossy Paper B | ○ | ○ | ○ |
| Example1-10 | Plain Paper | ○ | ○ | — |
| Formula(13) | Professional Glossy Paper A | ○ | ○ | Δ |
|  | Professional Glossy Paper B | ○ | ○ | ○ |
| Example1-11 | Plain Paper | ○ | ○ | — |

TABLE 7-continued

|  |  | Printing density | Light fastness | Ozone gas fastness |
|---|---|---|---|---|
| Formula(14) | Professional Glossy Paper A | ○ | ○ | ○ |
|  | Professional Glossy Paper B | ○ | ○ | ○ |
| Example1-12 | Plain Paper | ○ | ○ | — |
| Formula(15) | Professional Glossy Paper A | ○ | ○ | ○ |
|  | Professional Glossy Paper B | ○ | ○ | ○ |
| Comparative | Plain Paper | ○ | ○ | — |
| Example1-1 | Professional Glossy Paper A | ○ | X | X |
| Formula(18) | Professional Glossy Paper B | ○ | ○ | Δ |
| Comparative | Plain Paper | ○ | ○ | — |
| Example1-2 | Professional Glossy Paper A | ○ | X | X |
| Formula(19) | Professional Glossy Paper B | ○ | ○ | X |

From Table 7, it is found that an ink composition containing a trisazo compound according to the present invention has high printing density, and is excellent in ozone gas fastness and light fastness as compared with a conventional black colored dye (Comparative Examples).

Example 2-1

(1) After 20.1 part of 2-amino-5-naphthol-1,7-disulfonic acid and 12.6 part of p-toluenesulfonylchloride were subjected to reaction at pH 8.0 to 8.5, at 70° C. for 1 hour, 28.4 part of the compound of the following Formula (4) obtained by salting out in acidic condition and filtering was dissolved in 300 part of water while controlling pH at 6.0 to 8.0 with sodium carbonate, and thereafter, diazotized by adding 18.7 part of 35% hydrochloric acid, and at 0 to 5° C., 10.7 part of 40% aqueous solution of sodium nitrite.

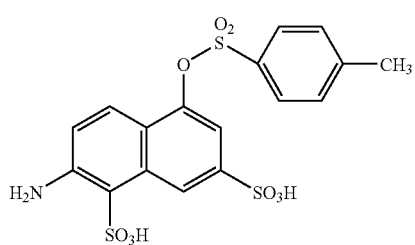

(4)

This diazo suspension was added with solution of 19.1 part of 4-amino-5-hydroxynaphthalene-1,7-disulfonic acid suspended in 200 part of water, followed by stirring for 12 hours while maintaining pH thereof at 2.4 to 2.8 with sodium carbonate, at 10 to 20° C. After stirring, by dissolving while adjusting pH at 7.0 to 8.5 with sodium carbonate, a solution containing a mono azo compound of Formula (6) was obtained.

(6)

[structural formula of compound (6)]

(2) 14.4 part of sodium 4-nitroaniline-2-sulfonate was dissolved in 150 part of water, herein followed by adding 18.8 part of 35% hydrochloric acid and 10.6 part of a solution of 40% sodium nitrite at 0 to 5° C. to be diazotized. This diazo suspension was added dropwise into a solution containing a mono azo compound of Formula (5) obtained by the above reaction, at 10 to 20° C. while maintaining pH value thereof at 8.0 to 9.0 with sodium carbonate. After completion of the dropwise addition, by stirring at pH 8.0 to 9.0, at 15 to 30° C. for 2 hours followed by salting out by the addition of sodium chloride and filtering, a wet cake containing a compound of the following Formula (1-8) was obtained.

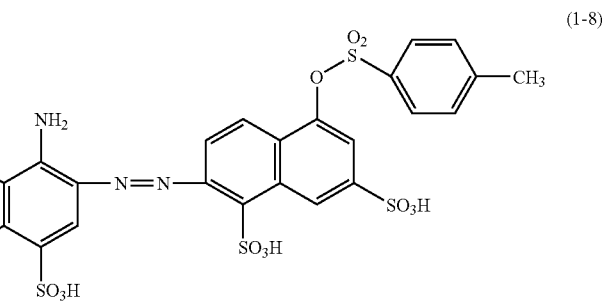

(1-8)

The above obtained wet cake was dissolved in 400 part of water and heated to 70° C., followed by stirring for 1 hour while maintaining pH at 10.5 to 11.0 with sodium hydroxide. After cooled to room temperature, by adjusting pH thereof at 7.0 to 8.0 with 35% hydrochloric acid, salting out by the addition of sodium chloride, and filtering, a wet cake containing a compound of the following Formula (1-9) was obtained.

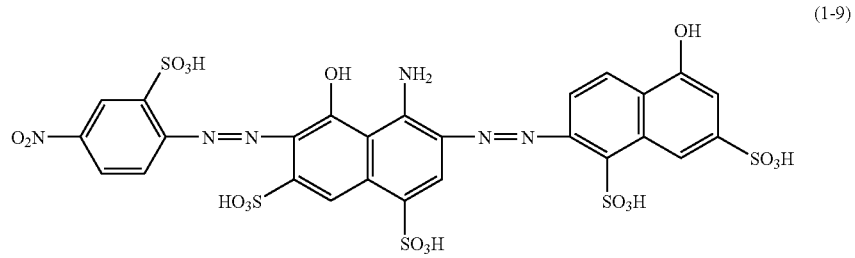

(1-9)

(3) 12.2 part of 2-aminobenzene-1,4-disulfonic acid monosodium salt was dissolved in 70 part of water at pH 5.0 to 7.0 by the addition of sodium hydroxide, herein followed by adding 12.7 part of 35% hydrochloric acid and 8.0 part of 40% sodium nitrite at 0 to 5° C. to be diazotized. The diazo suspension was added dropwise, at 15 to 30° C. maintaining pH thereof at 8.0 to 9.0 with sodium carbonate into a solution where a wet cake containing the above obtained compound of Formula (1-9) was dissolved in 300 part of water while controlling pH at 8.0 to 9.0 with sodium hydroxide. After the end of the dropwise addition, stirring was conducted at 15 to 30° C. for 3 hours at pH 8.0 to 9.0 to complete the coupling reaction, followed by the addition of sodium chloride for salting out and filtration. The obtained wet cake was dissolved in 200 part of water, crystallized by adding 150 part of methanol and 350 part of 2-propanol and filtered. This operation was repeated twice, and the obtained wet cake was dried to obtain 45.0 part of a compound of Formula (2-10) according to the present invention. The maximum absorption wavelength in water ($\lambda$max) of this compound was 592 nm, and solubility in water (ammonia alkalinity) was no less than 120 g/l.

water. In this connection, water and ammonium hydroxide was added in order that the ink composition had pH=8 to 9.

TABLE 8

| Compound obtained in the above example2-1 | 5.0 part |
| Glycerin | 5.0 part |

TABLE 8-continued

| Urea | 5.0 part |
| N-methyl-2-pyrolidone | 4.0 part |
| Isopropylalcohol | 3.0 part |
| Butylcarbitol | 2.0 part |
| Surfactant (Surfynol105 manufactured by Nissin Chemical Industry Co., Ltd.) | 0.1 part |
| Water + ammonium hydroxide | 75.9 part |
| Total | 100.0 part |

This water-based ink composition did not cause precipitation separation during storage thereof, and did not generate changed physical property after storage for a long period of time.

(B) Ink-jet Printing

Using each ink composition obtained above, by an ink-jet printer (Trade name BJ-S630 from Canon Inc.), ink-jet recording was conducted on three types of paper, Plain Paper (LBP PAPER LS-500 from Canon Inc.), Professional Glossy Paper PR (Professional Photopaper PR-101 from Canon

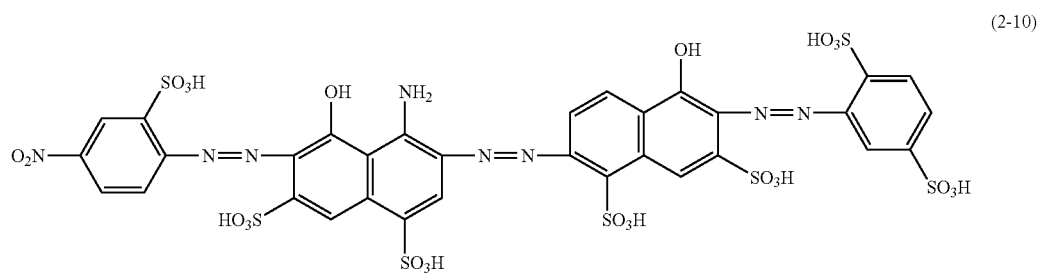

(2-10)

Example 2-2

(A) Production of an Ink

An ink composition according to the present invention was prepared by mixing each component described in Table 8 below, followed by filtering with a 0.45 μm membrane filter to remove impurities. Ion exchange water was used as Inc.), and Professional Glossy Paper PM (a paper for PM photograph (glossy), KA420PSK of Epson Co., Ltd.).

On printing, an image pattern was made so as to obtain gradations of several stages in reflection density, and a black colored print of half tone was obtained. As a gray scale mode is used on printing, each recording solution of yellow, cyan, and magenta is not used together besides a black colored recording solution. Among testing methods described below, in evaluation of printing density which is an item to be evaluated using a calorimeter, on measuring reflection density, D value, of a print, the highest portion of this D value was used. Further, on measuring in a test of light fastness and a test of ozone gas fastness which are similarly items to be evaluated using a colorimeter, measurement was conducted using a portion of gradations wherein reflection density, D value, of a print before testing is closest to 1.0.

Using this ink, printing was conducted on 10 pieces of Plain Paper a day for 1 month, and good printing was maintained without causing any low spot.

(C) Evaluation of a Recorded Image

Concerning a recorded image according to a water-based ink composition of the present invention, evaluation was conducted on 3 items, that is, printing density, change in density after light fastness testing, and change in hue after ozone gas fastness testing. In this connection, the ozone gas fastness test was conducted using only Professional Glossy Papers PR and PM. The results are shown in Table 9. The testing methods are shown below. Furthermore, part of a testing piece, not put into the evaluation tester, was kept to be a testing piece "before testing" for evaluations of the tests explained below.

1) Evaluations of Printing Density

Hue density of a recorded image was measured using Gretag •SPM50 (from GRETAG Co., Ltd.), and printing density D value was calculated. Judgment criteria are shown below.

○: a Plain Paper: $1.2 \leq D$, a Glossy Paper: $2.0 \leq D$
Δ: a Plain Paper: $1.0 \leq D < 1.2$, a Glossy Paper: $1.8 \leq D < 2.0$
x: a Plain Paper: $D < 1.0$, a Glossy Paper: $D < 1.8$ 2) Light Fastness Test Using a xenon weatherometer Ci4000 (from ATLAS Co., Ltd.), a testing piece was irradiated for 50 hours at illuminance of 0.36 W/m². After the test, using the above described colorimetry system, residual ratio of hue density before and after the test was measured. Judgment was conducted by the guideposts as shown below.

○: residual ratio is 90% or more
Δ: residual ratio is less than 95%, and 90% or more
x: residual ratio is less than 90%

3) Ozone Gas Fastness Test

Using an ozone weatherometer (from Suga Testing Machine Co., Ltd.), a print sample was left for six hour under ozone concentration of 40 ppm, humidity of 60% RH and temperature of 24° C. After the test, using the above described colorimetry system, ΔE (color difference) before and after the test was measured. Judgment was conducted by the criteria as shown below.

○: ΔE is lower than 15 when testing for six hours
Δ: ΔE is 15 or more and lower than 30 when testing for six hours
x: ΔE is 30 or more when testing for six hours (D) Solubility Test Dye being weighed, solutions respectively with concentration of 120 g/l, 100 g/l, 80 g/l and 60 g/l were prepared. Using ion exchanged water for a water, pH was adjusted at 9 to 9.5 with aqueous ammonia. They were treated with ultrasonic vessel at ordinary temperature. Toyo Filter Paper No. 131 was spotted with them, surface of which after dried was observed and solubility of which was determined. When a spot was uniform and insoluble material were not observed, it was judged to be soluble. When a spot was ununiform and insoluble material were observed, it was judged to be not soluble. The results are shown in Table 9

Comparative Example 2-1

Using, for comparison, a colorant of 1 in Table 1-1 described in Patent Literature 1 as a colorant (the following Formula (18)) for water-soluble ink-jet, an ink composition having the same ink composition as in Example 2-2 was prepared. The obtained evaluation results of solubility and printing density, light fastness and ozone gas fastness of a record image are shown in Table 9.

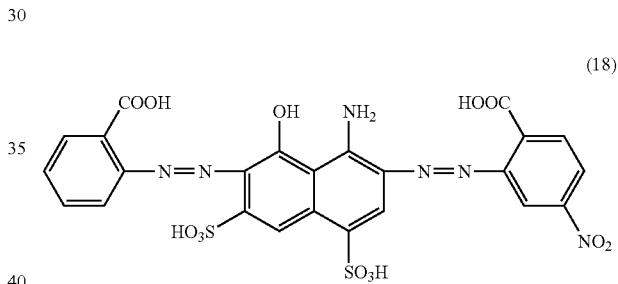

(18)

Comparative Example 2-2

Similarly, using, for comparison, a colorant AN-250 (the following Formula (19)) described in Example 1 of Patent Literature 3 as a colorant for a water-soluble ink-jet, an ink composition having the same composition as in Example 2-2 was prepared. The evaluation results of solubility and printing density, light fastness, and ozone gas fastness of a recorded image obtained are shown in Table 9.

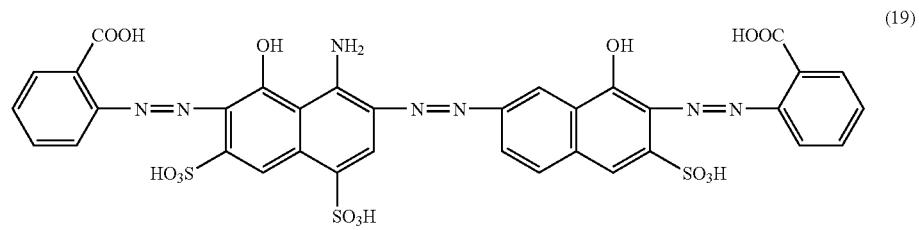

(19)

TABLE 9

|  | | Solubility (g/l) | Printing density | Light fastness | Ozone gas fastness |
|---|---|---|---|---|---|
| Example2-2 Formula(2-10) | | 120 | | | |
| | Plain Paper | | ○ | ○ | — |
| | Professional Glossy PaperPR | | ○ | ○ | Δ |
| | Professional Glossy PaperPM | | ○ | ○ | ○ |
| Comparative Example2-1 Formula(18) | | Not more than 60 | | | |
| | Plain Paper | | ○ | Δ | — |
| | Professional Glossy PaperPR | | ○ | Δ | X |
| | Professional Glossy PaperPM | | ○ | ○ | Δ |
| Comparative Example2-2 Formula(19) | | 60 | | | |
| | Plain Paper | | ○ | Δ | — |
| | Professional Glossy PaperPR | | ○ | Δ | X |
| | Professional Glossy PaperPM | | ○ | ○ | X |

From Table 9, it is found that an ink composition containing an azo compound according to the present invention has high printing density, and is excellent in ozone gas fastness and light fastness as compared in Comparative Examples 2-1 and 2-2. Furthermore, it is found that a trisazo compound according to the present invention has high solubility and can be designed for an ink having stable and high concentration.

Example 3-1

In the same manner as in Example 1-1 except that 9.8 part of 5-aminoisophthalic acid was used instead of 11.0 part of 4-methoxyaniline-2-sulfonic acid in Example 1-1, 31.1 part of a compound (a compound of No. 24 in Table 5) of Formula (3-1) according to the present invention was obtained. The maximum absorption wavelength in water of this compound was 591 nm, and solubility in water was no less than 100 g/l.

Example 3-2

In the same manner as in Example 1-1 except that 14.4 part of sodium 2-nitroaniline-4 sulfonate was used instead of 14.4 part of sodium 4-nitroaniline-2-sulfonate in Example 1-1, and that 9.8 part of 5-aminoisophthalic acid was used instead of 11.0 part of 4-methoxyaniline-2-sulfonic acid in Example 1-1, 29.0 part of a compound (a compound of No. 26 in Table 5) of a Formula (3-2) according to the present invention was obtained. The maximum absorption wavelength in water of this compound was 597 nm, and solubility in water was no less than 100 g/l.

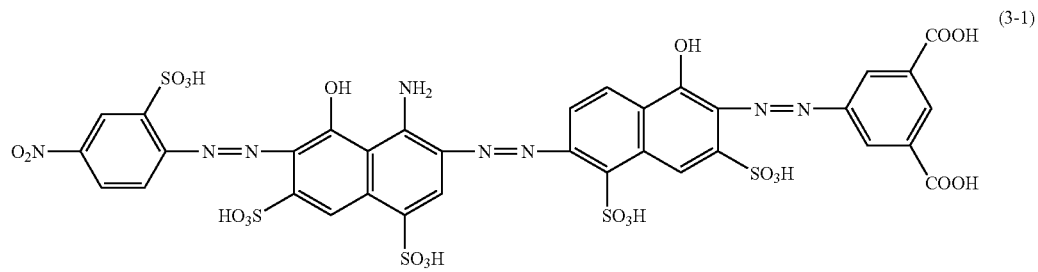

(3-1)

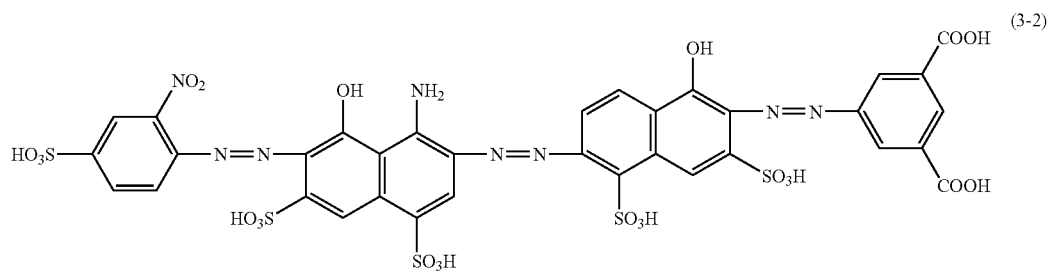

(3-2)

Examples 3-3 to 3-4

(A) Production of an Ink

An ink composition according to the present invention was prepared by mixing each component described in Table 10 below, followed by filtering with a 0.45 μm membrane filter to remove impurities. Ion exchange water was used as water. In this connection, water and ammonium hydroxide was added in order that the ink composition had pH=8 to 9.

TABLE 10

| Each compound obtained in the above examples | 5.0 part |
|---|---|
| Glycerin | 5.0 part |
| Urea | 5.0 part |
| N-methyl-2-pyrolidone | 4.0 part |
| Isopropylalcohol | 3.0 part |
| Butylcarbitol | 2.0 part |
| Surfactant (Surfynol105 manufactured by Nissin Chemical Industry Co., Ltd.) | 0.1 part |
| Water + ammonium hydroxide | 75.9 part |
| Total | 100.0 part |

In Table 10, "Each compound obtained in the above Examples" mean respectively a compound of Formula (3-1) for Example 3-3 and a compound of Formula (3-2) for Example 3-4. This water-based ink composition did not cause precipitation separation during storage thereof, and did not generate changed physical property after storage for a long period of time.

(B) Ink-jet Printing

Using each ink composition obtained above, by an ink-jet printer (Trade name BJ-S630 from Canon Inc.), ink-jet recording was conducted on three types of paper, Plain Paper (LBP PAPER LS-500 from Canon Inc.), Professional Glossy Paper PR (Professional Photopaper PR-101 from Canon Inc.), and Professional Glossy Paper PM (a paper for PM photograph (glossy), KA420PSK of Epson Co., Ltd.).

On printing, an image pattern was made so as to obtain gradations of several stages in reflection density, and a black colored print of half tone was obtained. As a gray scale mode is used on printing, each recording solution of yellow, cyan, and magenta is not used together besides a black colored recording solution for this pale tone part. Among testing methods described below, in evaluation of printing density which is an item to be evaluated using a calorimeter, on measuring reflection density, D value, of a print, the highest portion of this D value was used. Further, on measuring in a test of light fastness and a test of ozone gas fastness which are similarly items to be evaluated using a colorimeter, measurement was conducted using a portion of gradations wherein reflection density, D value, of a print before testing is closest to 1.0.

(C) Evaluation of a Recorded Image

Concerning a recorded image according to a water-based ink composition of the present invention, evaluation was conducted on 3 items, that is, printing density, change in density after light fastness testing, and change in hue after ozone gas fastness testing. In this connection, the ozone gas fastness test was conducted using only Professional Glossy Papers PR and PM. The results are shown in Table 11. The testing methods are shown below. Furthermore, part of a testing piece, not put into the evaluation tester, was kept to be a testing piece "before testing" for evaluations of the tests explained below.

1) Evaluations of Printing Density

Hue density of a recorded image was measured using Gretag: •SPM50 (from GRETAG Co., Ltd.), and printing density D value was calculated. Judgment criteria are shown below.

○: a Plain Paper: $1.2 \leq D$, a Glossy Paper: $2.0 \leq D$
Δ: a Plain Paper: $1.0 \leq D < 1.2$, a Glossy Paper: $1.8 \leq D < 2.0$
×: a Plain Paper: $D < 1.0$, a Glossy Paper: $D < 1.8$ 2) Light Fastness Test Using a xenon weatherometer Ci4000 (from ATLAS Co., Ltd.), a testing piece was irradiated for 50 hours at illuminance of 0.36 W/m$^2$. After the test, using the above described colorimetry system, percentage reduction of hue density before and after the test was measured. Judgment was conducted by the guideposts as shown below.

○: residual ratio is 95% or more
Δ: residual ratio is less than 95%, and 90% or more
×: residual ratio is less than 90%

3) Ozone Gas Fastness Test

Using an ozone weatherometer (from Suga Testing Machine Co., Ltd.), a print sample was left for six hours under ozone concentration of 40 ppm, humidity of 60% RH and temperature of 24° C. After the test, colorimetry was conducted using the above described color measuring system and color difference (ΔE) before and after the test was measured. Judgment was conducted by the criteria as shown below.

○: ΔE is lower than 15 when testing for six hours
Δ: ΔE is 15 or more and lower than 30 when testing for six hours
×: ΔE is 30 or more when testing for six hours Comparative Example 3-1

Using, for comparison, a colorant (the following Formula (18)) of 1 in Table 1-1 described in Patent Literature 1 as a colorant for a water-soluble ink-jet, an ink composition having the same ink composition as in Example 3-3 was prepared. The obtained evaluation results of printing density, light fastness, and ozone gas fastness of a recorded image are shown in Table 11.

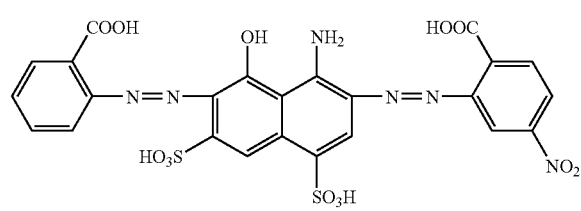

(18)

Comparative Example 3-2

Similarly, using, for comparison, a colorant AN-250 (the following Formula (19)) described in Example 1 of Patent Literature 3 as a colorant for a water-soluble ink-jet, an ink composition having the same composition as in Example 3-3 was prepared. The obtained evaluation results of printing density, light fastness, and ozone gas fastness of a recorded image are shown in Table 11.

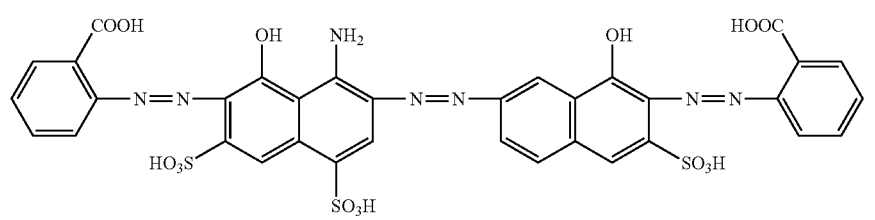

(19)

TABLE 11

|  |  | Printing density | Light fastness | Ozone gas fastness |
|---|---|---|---|---|
| Example3-3 | Plain Paper | ○ | ○ | — |
| Formula(3-1) | Professional Glossy Paper PR | ○ | ○ | Δ |
|  | Professional Glossy Paper PM | ○ | ○ | ○ |
| Example3-4 | Plain Paper | ○ | ○ | — |
| Formula(3-2) | Professional Glossy Paper PR | ○ | ○ | Δ |
|  | Professional Glossy Paper PM | ○ | ○ | ○ |
| Comparative | Plain Paper | ○ | Δ | — |
| Example3-1 | Professional Glossy Paper PR | ○ | Δ | X |
| Formula(18) | Professional Glossy Paper PM | ○ | ○ | Δ |
| Comparative | Plain Paper | ○ | Δ | — |
| Example3-2 | Professional Glossy Paper PR | ○ | Δ | X |
| Formula(19) | Professional Glossy Paper PM | ○ | ○ | X |

From Table 11, it is found that an ink composition containing a trisazo compound according to the present invention has high printing density, and is excellent in ozone gas fastness and light fastness as compared with a conventional black colored dye (Comparative Examples).

Example 4-1

11.0 part of 4-methoxyaniline-2-sulfonic acid was dissolved in 100 part of water at pH 5.0 to 7.0 by the addition of lithium hydroxide, herein followed by the addition of 15.8 part of 35% hydrochloric acid and 9.6 part of 40% sodium nitrite at 0 to 5° C. to be diazotized. The diazo suspension was added dropwise maintaining pH of the solution at 8.0 to 9.0 with lithium hydroxide at 15 to 30° C. into a solution where a wet cake containing the above obtained compound of Formula (1-9) was dissolved in 300 part of water while controlling pH at 8.0 to 9.0 with lithium hydroxide. After the end of the dropwise addition, stirring was conducted at 15 to 30° C. for 3 hours at pH 8.0 to 9.0 to complete the coupling reaction, followed by the addition of sodium chloride for salting out and filtration. The obtained wet cake was dissolved in 300 part of water, crystallized by adding 600 part of 2-propanol and filtered. Furthermore, the obtained wet cake was dissolved in 250 part of water, crystallized by adding 600 part of 2-propanol, filtered and dried to obtain a compound (a compound of No. 1 in Table 2) of Formula (11) according to the present invention. The maximum absorption wavelength in water (λmax) of this compound was 595 nm, and solubility in water was no less than 100 g/l.

The invention claimed is:

1. A trisazo compound represented by Formula (1) as shown below or a salt thereof;

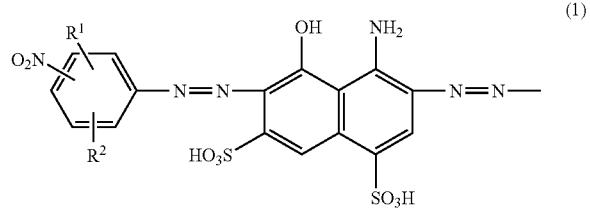

(1)

-continued

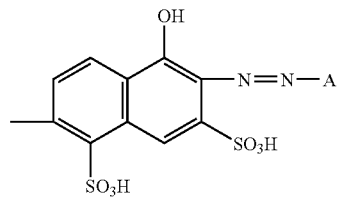

wherein, each of $R^1$ and $R^2$ independently represents a hydrogen atom; a halogen atom; a cyano group; a carboxyl group; a sulfo group; a sulfamoyl group; an N-alkylaminosulfonyl group; an N-phenylaminosulfonyl group; a phosphoric acid group; a nitro group; an acyl group; a ureide group; a (C1 to C4) alkyl group which may be substituted with a hydroxy group or a (C1 to C4) alkoxy group; a (C1 to C4) alkoxy group which may be substituted with a hydroxy group, a (C1 to C4) alkoxy group, a sulfo group or a carboxyl group; or an acylamino group: A represents a phenyl group or a naphthyl group wherein, these phenyl group and naphthyl group may be substituted with a halogen atom; a cyano group; a carboxyl group; a sulfo group; a sulfamoyl group which may be substituted with an alkyl group or a phenyl group; a phosphoric acid group; a nitro group; an acyl group; a ureide group; a (C1 to C4) alkyl group which may be substituted with a hydroxy group or a (C1 to C4) alkoxy group; a (C1 to C4) alkoxy group which may be substituted with a hydroxy group, a (C1 to C4) alkoxy group, a sulfo group or a carboxyl group; or an acylamino group.

2. The trisazo compound or a salt thereof according to claim 1, wherein Formula (1) is represented by Formula (2) as shown below;

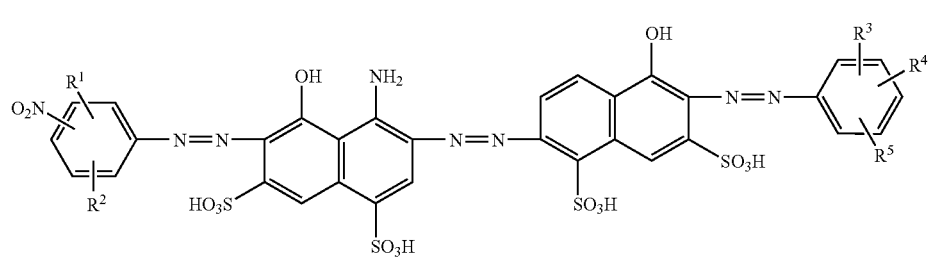

(2)

wherein, $R^1$ represents a carboxyl group, a sulfo group, or a (C1 to C4) alkoxyl group, $R^2$ represents a hydrogen atom or a sulfo group, $R^3$ represents a carboxyl group, a sulfo group, or a (C1 to C4) alkoxy group, $R^4$ represents a hydrogen atom, halogen atom, a carboxyl group, a sulfo group, a nitro group, a (C1 to C4) alkoxy group, a sulfamoyl group or an N—(C1 to C4) alkyl amino sulfonyl group, and $R^5$ represents a hydrogen atom, a carboxyl group or a sulfo group, respectively.

3. The trisazo compound or a salt thereof according to claim 2, wherein in Formula (2), $R^1$ is bonded at the 2-position of an azo group, a nitro group is bonded at the 4-position, $R^2$ is bonded at the 5-position, $R^3$ is bonded at the 2-position of an azo group, $R^4$ is bonded at the 4-position and $R^5$ is bonded at the 5- or 6-position.

4. The trisazo compound or a salt thereof according to claim 3, wherein in Formula (2), $R^3$ is a carboxyl group or a sulfo group, $R^4$ is a carboxyl group, a sulfo group, a sulfamoyl group, an N—(C1 to C4) alkylaminosulfonyl group, a nitro group or a (C1 to C4) alkoxyl group, $R^5$ is a hydrogen atom or a carboxyl group, $R^3$ is bonded at the 2-position of an azo group, $R^4$ is bonded at the 4-position and $R^5$ is bonded at the 5-position.

5. The trisazo compound or the salt thereof according to claim 1, wherein Formula (1) is represented by Formula (2') as shown bellow;

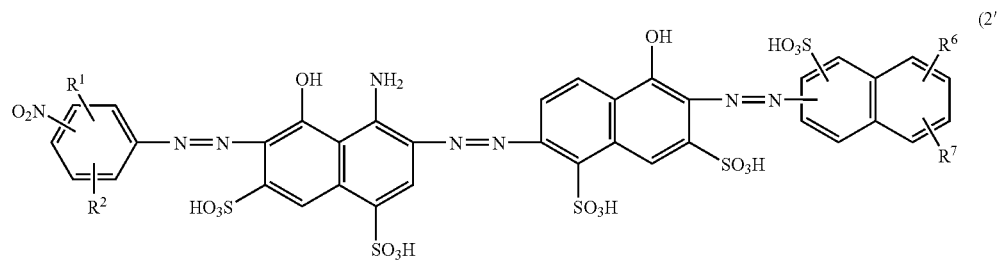

(2')

wherein $R^1$ represents a carboxyl group or a sulfo group, $R^2$ represents a hydrogen atom, $R^6$ represents a sulfo group or a nitro group, and $R^7$ represents a hydrogen atom or a sulfo group, respectively.

6. The trisazo compound or the salt thereof according to claim 5, wherein in Formula (2'), $R^1$ is bonded at the 2-position of an azo group, a nitro group on a phenyl group is bonded at the 4-position, for a naphthyl group substituted with $R^6$ or $R^7$, an azo group is bonded at the 1- or 2-position of a naphthyl group, $R^6$ is bonded at the 5- or 6-position, and $R^7$ is bonded at the 7- or 8-position.

7. The trisazo compound represented by Formula (2-1) as shown bellow or a salt thereof;

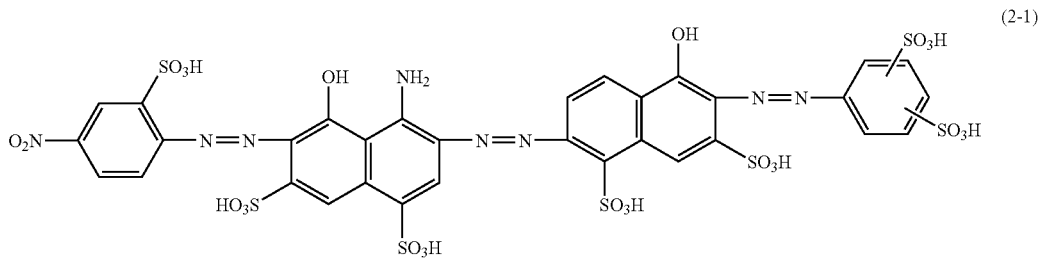

(2-1)

8. The salt of the trisazo compound according to claim 1 or 7, wherein the salt is a lithium salt, a sodium salt, a potassium salt, an ammonium salt, or an ammonium salt represented by a general Formula (3);

(3)

wherein, each of $Z^1$, $Z^2$, $Z^3$, and $Z^4$ independently represents a hydrogen atom, an alkyl group, a hydroxyalkyl group or a hydroxyalkoxyalkyl group.

9. An ink composition characterized by comprising at least one of the trisazo compound or the salt thereof according to claim 1 or 7.

10. An ink-jet printer equipped with a container containing the ink composition according to claim 9.

11. A recording method of ink-jet printing utilizing the ink composition according to claim 9.

12. A recording method of ink-jet printing, wherein a record-receiving material for a method of ink-jet printing according to claim 11 is an information transmission sheet.

13. The recording method of ink-jet printing according to claim 12, characterized by an information transmission sheet which comprises a porous white inorganic matter.

14. A colored object colored by the trisazo compound or the salt thereof according to claim 1 or 7.

15. An ink composition characterized by comprising at least one of the trisazo compound or the salt thereof according to claim 8.

16. A colored object colored by the trisazo compound or the salt thereof according to claim 8.

* * * * *